(12) United States Patent
Gaia et al.

(10) Patent No.: US 7,937,287 B2
(45) Date of Patent: May 3, 2011

(54) MEETING EFFECTIVENESS PROGRAM OPTIMIZATION

(75) Inventors: Christopher James Gaia, St. Louis, MO (US); Lynn Stadler Randall, University City, MO (US); Keith Chrzan, Chesterton, IN (US)

(73) Assignee: Maritz Inc., Fenton, MO (US)

( * ) Notice: Subject to any disclaimer, the term of this patent is extended or adjusted under 35 U.S.C. 154(b) by 436 days.

(21) Appl. No.: 12/018,009

(22) Filed: Jan. 22, 2008

(65) Prior Publication Data
US 2008/0201207 A1 Aug. 21, 2008

Related U.S. Application Data

(60) Provisional application No. 60/885,857, filed on Jan. 19, 2007.

(51) Int. Cl.
G06F 17/30 (2006.01)
(52) U.S. Cl. .......................................................... 705/10
(58) Field of Classification Search ................. 705/1, 14, 705/8–12
See application file for complete search history.

(56) References Cited

U.S. PATENT DOCUMENTS

| | | | |
|---|---|---|---|
| 6,061,660 A | 5/2000 | Eggleston et al. | |
| 6,189,029 B1* | 2/2001 | Fuerst | 709/217 |
| 6,539,392 B1 | 3/2003 | Rebane | |
| 6,934,748 B1* | 8/2005 | Louviere et al. | 709/224 |
| 6,965,868 B1 | 11/2005 | Bednarek | |
| 2002/0004739 A1 | 1/2002 | Elmer et al. | |
| 2003/0009373 A1* | 1/2003 | Ensing et al. | 705/10 |
| 2003/0200142 A1 | 10/2003 | Hicks et al. | |
| 2004/0098306 A1 | 5/2004 | Fitzpatrick et al. | |
| 2005/0096950 A1* | 5/2005 | Caplan et al. | 705/7 |
| 2005/0209914 A1* | 9/2005 | Nguyen et al. | 705/14 |
| 2005/0261953 A1* | 11/2005 | Malek et al. | 705/10 |
| 2005/0267875 A1 | 12/2005 | Bentley, III | |
| 2006/0010023 A1* | 1/2006 | Tromczynski et al. | 705/8 |
| 2006/0121434 A1 | 6/2006 | Azar | |
| 2006/0287914 A1 | 12/2006 | Shelley | |
| 2008/0091510 A1 | 4/2008 | Crandall et al. | |
| 2008/0228560 A1 | 9/2008 | Mack et al. | |

OTHER PUBLICATIONS

Aaker, David A., Kumar, V. and Day, George S. "Marketing Research", 2001, John Wiley & Sons, Seventh Edition.*
Cohen; Maximum Difference Scaling: Improved Measures of Importance and Preference for Segmentation; Sawtooth Software Research Paper Series; 2003; 18 pgs; Sawtooth Software, Inc., Sequim, WA, USA.
Chrzan et al.; An Overview and Comparison of Design Strategies for Choice-Based Conjoint Analysis; Sawtooth Software Research Paper Series; 2000; 19 pgs; Sawtooth Software, Inc., Sequim, WA, USA.
White Papers Library: Conjoint Research Choice-Based Conjoint vs. Preference-Based Conjoint; 2 pgs; printed on Jul. 6, 2006 from http://www.dssresearch.com/tooklit/resource/papers/CR02.asn; DSS Research, USA.

(Continued)

*Primary Examiner* — Susanna M Diaz
(74) *Attorney, Agent, or Firm* — Senniger Powers LLP

(57) ABSTRACT

A method and system of developing an event designed to appeal to prospective attendees associated with an event-owner. First and second different events are defined as a function of modeled values and defined attributes having values corresponding to collected preferred values. The event-owner compares the first reward program to the second reward program as a function of the weighted prospective attendee preferred values and selects and implements one of the events based on the provided comparison.

5 Claims, 6 Drawing Sheets

OTHER PUBLICATIONS

White Papers Library: Conjoint Research Conjoint on the Web; 13 pgs; printed on Jul. 6, 2006 from http://www.dssresearch.com/toolkit/resource/papers/CR03.asn; DSS Research, USA.

Riedesel; A Brief Introduction to Discrete Choice Analysis in Marketing Research; 10 pgs; printed on Jul. 26, 2006 from http://www.action-research.com/discrete.htm; Action Marketing Research, Inc., Minneapolis, MN, USA.

Chrzan; Choice-Based Approach for Large Numbers of Attributes; Marketing News; Jan. 2, 1995; 4 pgs; vol. 29, No. 1; American Marketing Association, USA.

Disaggregate Discrete Choice Analysis; 1 pg; printed on Jul. 6, 2006 from ipsosinsight.com/researchexpertise/discrete.aspx; IPSOS-Insight, USA.

Choice-Based Conjoint Analysis; 1 pg; printed on Jul. 6, 2006 from ipsosinsight.com/researchexpertise/conjoing.aspx; IPSOS-Insight, USA.

Make Your Data Come Alive; 1 pg; printed on Jul. 6, 2006 from ipsosinsight.com/researchexpertise/analytics.aspx; IPSOS-Insight, USA.

Conducting Conjoint and Discrete Choice Analysis and Modeling; Burke White Paper Series; 2000; 2 pgs; vol. 2, Issue 8; Burke Incorporated, Cincinnati, OH, USA.

Partial Profile Conjoint Experiments (PPCE); printed on Jul. 6, 2006 from http://www.inteliquest.com/resources/whitepapers/wp_ppce.pdf, 3 pgs.

Krieger et al.; Adventures in Conjoint Analysis: A Practitioner's Guide to Trade-Off Modeling and Applications; 2 pgs; printed on Jul. 6, 2006 from http://www-marketing.wharton.upenn.edu/people/faculty/green-monograph.html; University of Pennsylvania, Philadelphia, PA, USA.

Krieger et al.; Adverteres in Conjoint Analysis: A Practitioner's Guide to Trade-Off Modeling and Applications; Mar. 2004; consisting of Title Page, Table of Contents, Preface, Introduction and Technical Appendix, Part I. Product Positioning and Market Segmentation, Chapter 2. Line Extending and Potential Cannibalization, Chapter 3. Dynamic Conjoint Simulators/Optimizers, Chapter 4. Market Segmentation, 117 pgs; Wharton School, University of Pennsylvania, Philadelphia, PA, USA.

\* cited by examiner

MEETING EFFECTIVENESS PROGRAM OPTIMIZATION

BACKGROUND

Businesses spend hundreds of thousands of dollars marketing their products every year. As part of this marketing budget, many companies choose to host events or meetings that center around their products and services. Some of these meetings are targeted to customers, such as user's conferences or product launches. Others are targeted toward sales professionals, such as sales conferences. For those in charge of meeting and event programs, there is continuing pressure to justify the expense of such events by demonstrating how effective the meeting or event was in relation to the overall corporate goals.

BRIEF DESCRIPTION OF THE DRAWINGS

Corresponding reference characters indicate corresponding parts throughout the drawings.

DETAILED DESCRIPTION

Figure 1:
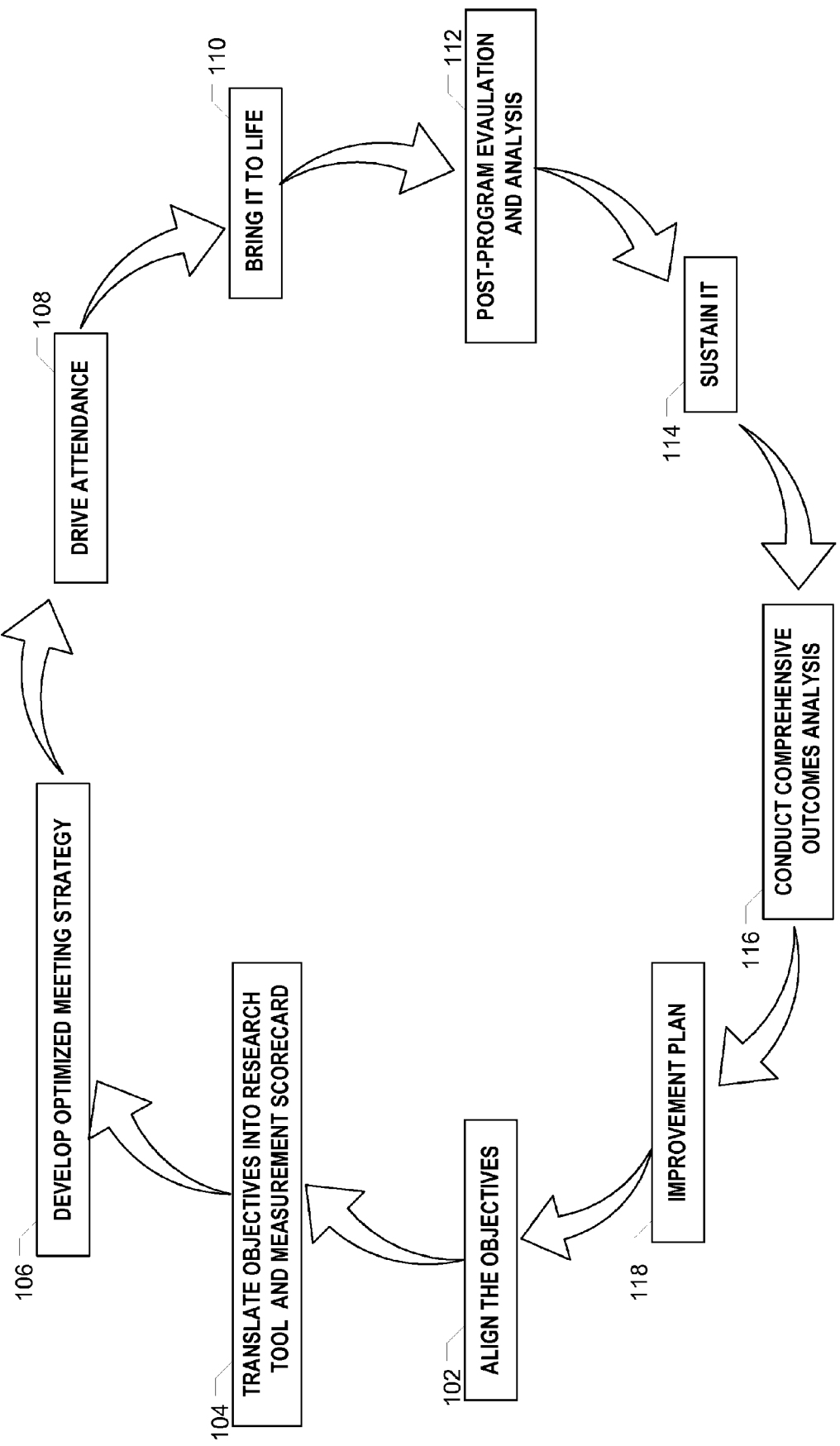
FIG. 1 is a flow diagram for an exemplary nine-step method for maximizing the effective outcome of an event according to one embodiment of the invention.

FIG. 1 is a flow diagram for an exemplary nine-step method embodying aspects of the invention for maximizing the effective outcome of an event, meeting or conference hosted by a corporation or company. Step 102, aligning the objectives, involves performing background research to gain an understanding of the corporation and how the event fits into a corporation's marketing strategy. Additionally, information is gathered to understand the corporation's position in the industry (including competitors) and how the event fits into the industry. The compiled research is used to formulate assumptions regarding the corporation and the event. These assumptions are then discussed in detail with the event stakeholders during a discovery session to ensure that the event is aligned with the goals of the corporation. During the discovery session, (1) the corporation's corporate and marketing strategies are identified; (2) the event strategy and goals are defined; (3) the event audience expectations are identified; and (4) past communication, event promotion, content and messaging are discussed.

At step 104, the objectives identified during step 1 are used to develop the decision support tool and to create an event measurement scorecard. The event measurement scorecard defines, for example, the objectives and goals of the event in a quantitative way. The scorecard is used to measure the meeting's or event's effectiveness as a function of the event's objectives. For example, one such objective could be to influence the intent to purchase product A. The goal could be a 5 percent increase in the intent to purchase product A attributed to the event. Thus, the event is considered effective if 5 percent more people would intend to purchase product A after the event than before the event. Pre-event scorecard survey questions are then formulated to obtain baseline pre-event measurements of the scorecard objectives from prospective attendees.

To develop the decision support tool, attributes and values are defined to create further pre-event survey event choice questions. These questions are designed to gather information on the type of event prospective attendees would prefer to attend. Examples of attributes include: Time of year, Type of attendees, Type of Content, Type of Exhibitors, Amount of time to visit exhibits, General Session Speakers, Type of Info at general session, Frequency of general session, Meeting track format, Breakout Content, Breakout Length, Special Events, and Length of Event Day. Values are possible preferences of the event attendees. For example, the values for General Session Speakers may include executives from corporation, entertainers, industry experts, thought leaders and motivational speakers while the values for Breakout Length include, for example, 45 minute presentations and 3 hour "deep dive" sessions. Appendix A contains an example of possible attributes and their corresponding values.

Additional direct question pre-event survey questions are also defined. These questions are used to gather other information regarding possible attendees to the event including industry information and demographic information such as geographic location, age, and job function. Once the pre-event survey is defined, it is executed. The decision support tool is built upon the results and the pre-event metrics for the scorecard are established. Appendix B contains an example of a pre-event survey.

At step 106 of the exemplary flow diagram, an optimized event strategy is developed using the pre-event survey data and the decision support tool. Messages are aligned to corporate objectives and communicating the event value proposition (a clear and specific statement about the tangible benefits of the event). The environment for the event is optimized using the decision support tool. The decision support tool allows the customer to view many event scenarios and see how the scenario impacts the attendees' decision to attend the event. From these scenarios, the event can be designed to appeal to specific target attendee groups (e.g. IT managers and Europeans). Once the environment is established, strategies to generate and invite potential attendees are established. Furthermore, once the initial invitation is issued, strategies to sustain attendee interest in the event are developed.

At step 108, the strategies to generate and invite potential attendees are implemented. The information gathered from the discovery session and the pre-event survey are used to drive event attendance. The strategy includes promotion of the event and setting a tone for the event. Furthermore, real-time measurements of registrations by audience segments are monitored to achieve attendance goals expectations.

At step 110, the event is held. During the event, on site real-time measurements are obtained to track sessions and to aid exhibitor lead management. Session tracking includes attendance, tracking attendee types (i.e. senior management, IT support) as well as the attendees' responses to the sessions. For example, immediately after each session, a number of attendees are asked questions about the session to measure the attendee type (i.e. senior management, IT support) as well as the attendees' response to the session.

Exhibitor lead management includes tracking the type (i.e. senior management, IT support) and number of attendees that visited each exhibitor and if any of these visits lead to a sale. This information can then be used to select exhibitors for the next event or be shared with the exhibitors to add value to their sponsorship of the event.

At step 112, post-event evaluation and analysis is conducted. First, a post-event comparative survey is executed. The post-event survey is similar to the pre-event survey consisting of the direct question pre-event survey questions and the pre-event scorecard survey questions. The post-event survey is used to gather measurements used to populate event measurement scorecard and to evaluate any business opportunities identified during the event. Appendix D contains an example of a post-event survey.

At step 114, the momentum gained from the event is sustained by continued communication with attendees and other event stakeholders. In particular, attendees receive communications designed to reinforce the event message and communication that contain a call for action (next steps). Communications to other event stakeholders are designed to reinforce event value as well as to gather anecdotal feedback. These communications can be delivered via email, direct mail, telephone, or other methods known to one skilled in the art.

At step 116, comprehensive outcomes analysis is conducted. The pre and post-event research findings plus sustainment results are carefully evaluated to identify areas of success as well as areas of improvement. From this analysis, at step 118, an improvement plan is designed. In one embodiment, the improvement plan contains analysis recommendations and updated event objectives, with the goal of continuous improvement. Appendix C contains an example analysis report with recommendations.

Figure 2:
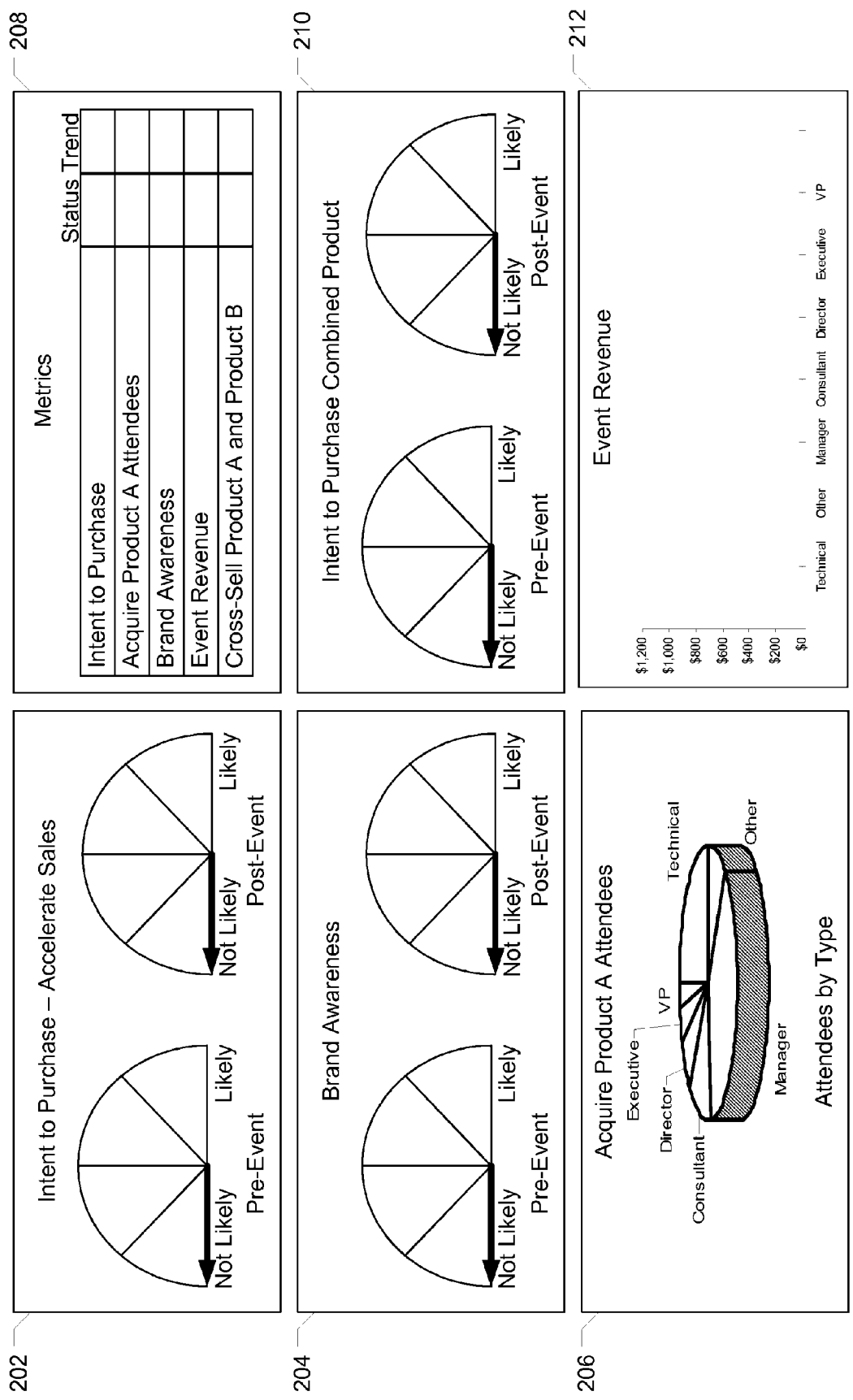
FIG. 2 is a block diagram illustrating a scorecard according to an aspect of the invention.

FIG. 2 is a block diagram illustrating a scorecard according to an aspect of the invention. The metrics box 208 provides a pre-event/post-event comparison of the objectives being measured. The intent to purchase box 202 displays the percentage bump gain in the intent to purchase product A. The pre-event survey is used to obtain an accurate measure of the purchase intent before the event. The survey captures intent by self-report by attendees. The pre-event measure is compared to self-report again in a post-event survey to generate a percentage bump gain. The generated percentage bump gain is then compared to the goal set for the objective during Step 104 described above. The survey also captures data by audience segment whether they consider themselves an influencer or decision-maker on product purchases.

The acquire Product A attendees 206 box displays the acceptable gain in product A attendees. This may be expressed as a pure number or as a percentage improvement over last year's numbers. The pre-event survey will capture demographics on the product A segment due to the lack of known information on the segment. This additional demographic data can be used by decision-makers and others to improve the event and refine product marketing efforts. Data from the post-event survey results will provide a comparative report.

The brand awareness box 204 displays the gain on awareness of existing brand image and tagline. The initial metric will be derived from the pre-event survey on awareness of existing brand image and tagline. Data from the post-event survey results will provide a comparative report.

The event revenue track box 212 displays a breakeven measure. Additionally, revenue is tracked by attendee type for use in future plans for attendee acquisition and event fee strategy planning.

The cross-sell Product A and Product B box 210 displays the gain percentage increase of intent to purchase the converged product set. An accurate measure of current cross-sell intent is generated from the pre-event survey by self-report. Data from the post-event survey results will provide a comparative self-report.

Although described in the context of a relatively large event for promoting a product, it is to be understood that aspects of the invention may be applied to meetings of any size and for the purpose of accomplishing any objective.

Figure 3:
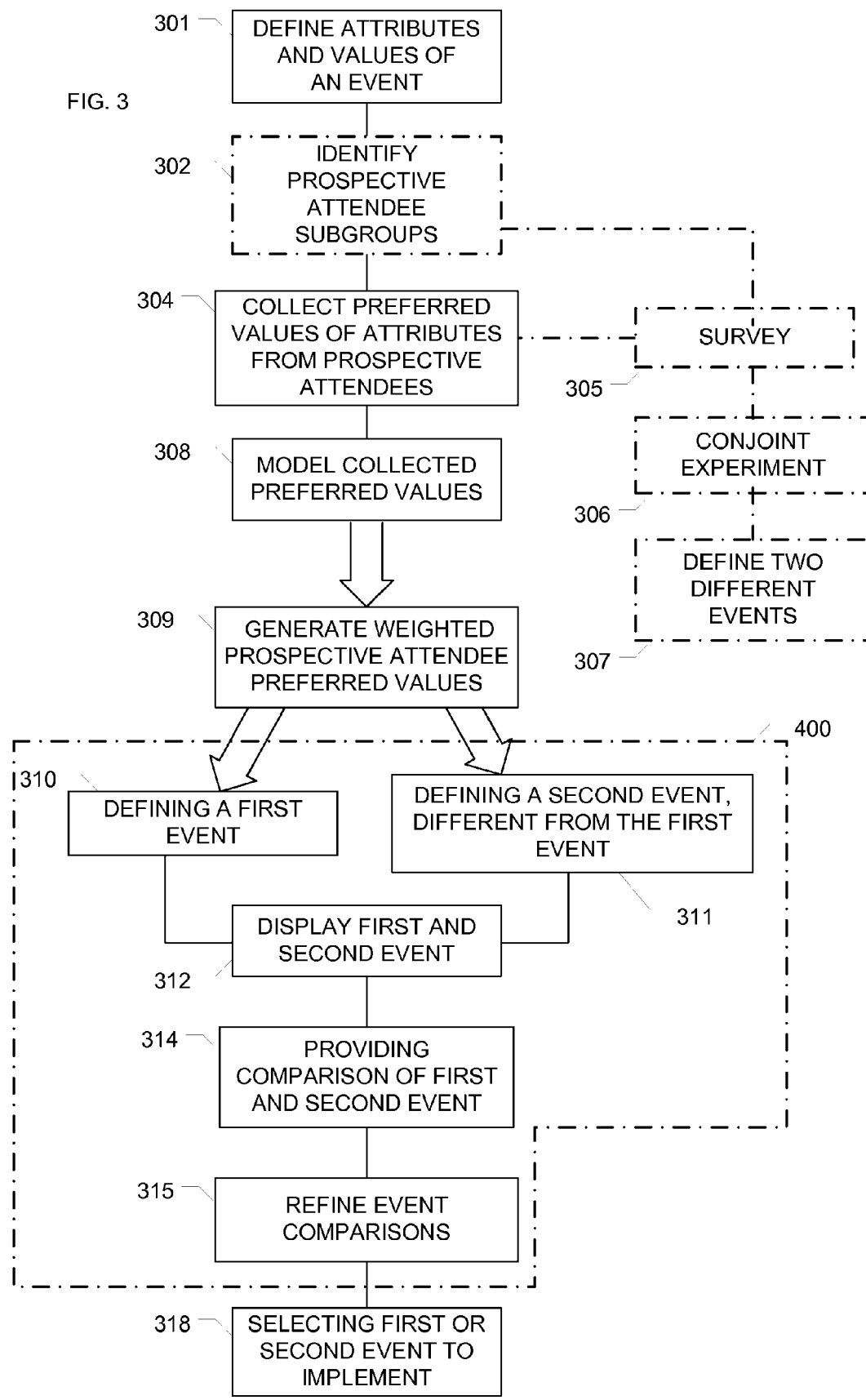
FIG. 3 is a flow diagram of a method for developing an event for prospective attendees according to an aspect of the invention.

FIG. 3 is a flow diagram of one embodiment of a method for developing an event, conference, or meeting for prospective attendees related to an event-owner. The event-owner develops the event to educate the prospective attendees about the products and solutions of the event-owner. For example, a company (as an event-owner) may wish to develop an event to educate its salespeople (as prospective attendees) regarding new products. In another example, a company may wish to sponsor a user conference to provide a forum for new and existing customers to learn how to effectively use the company's products. The event-owner may include, but is not limited to, one or more of the following: a company, consulting firm, an employer and a manufacturer. The prospective attendees may include, but are not limited to, employees, customers, potential customers, salespersons, dealers and distributors related to the event-owner. The event may include, but is not limited to, at least one of the following: a user's conference, a sales meeting, a customer event, and a product launch.

FIG. 3 illustrates one embodiment of a method for developing the event. In this instance, the method may be accomplished by the event-owner, by a third party, such as a program developer, on behalf of the event-owner or by the owner working in conjunction with the developer. Once the event has been developed, a program manager (which may be the event-owner or the program developer) implements the event. For example, the program manager administers the event by registering prospective attendees, data, communicating with the prospective attendees regarding the event, and other related administrative functions. For convenience, it is assumed herein that the program manager is the program developer.

Referring further to FIG. 3, the event-owner initially identifies a list of attributes for the event and a list of potential values for each of the attributes at 301. Appendix A contains an exemplary list of attributes and potential values.

Once the attributes are defined, a list of potential values for each attribute is specified. Potential values for the attributes are the possible values for the attribute. Subgroups of prospective attendees are optionally identified at 302 by the event-owner. By identifying subgroups of prospective attendees, the event-owner is able to target the event to a particular group of prospective attendees. For example, if the event-owner identifies the prospective attendees by geographic region, then the event-owner can develop an event targeted to the prospective attendees within the particular geographic region. Subgroups of prospective attendees may be related to demographic data, firmographic data, and past event data.

Demographic data may include, but are not limited to, the following information regarding the prospective attendee: geographic location, age, gender, ethnicity, marital status, number of children, education and household income. Firmographic data may include, but not limited to, the following information regarding the prospective attendee's employment: job function, level of responsibility and years of service. And, past event experience data may include, but not limited to, regarding the prospective attendee's past experiences with events.

At 304, the prospective attendees preferred values of the attributes are collected by the event manager. In one embodiment, a survey 305 is provided to a subset of potential prospective attendees to collect prospective attendees preferred values. The survey 305 may be offered to all prospective attendees, all potential prospective attendees to the event, or a subset of the potential prospective attendees. The survey 305 may be conducted online, conducted through paper surveys, or conducted through any other known surveying techniques.

The prospective attendees preferred values are gathered at 304 through a choice-based conjoint experiment 306 in the survey 305 that measures the impact of attributes that make up the event through utility estimates. In the experiment 306, prospective attendees are asked questions that require them to choose among pairs of events that always differ on a small number of attribute values. If the event-owner decides not to offer a particular value for one of attributes, then that value will not be part of the experiment 306. For example, if the event-owner decides that the event will not include motivational speakers, then the motivational focus value for meeting emphasis attribute will be eliminated from the experiment 306.

In one embodiment, prospective attendees are shown the survey 305 as including two different events 307 side by side and are asked to choose the event that provides the most value to the attendee to collect the prospective attendees preferred values.

The survey 305 includes enough questions per prospective attendee to allow the prospective attendee preferred values to be analyzed via hierarchical Bayesian multinomial logit (HB-MNL). Appendix B contains the survey questions used to create the choice-based conjoint experiment to collect prospective attendees preferred values in one embodiment of the invention.

In embodiments where subgroups of prospective attendees have been identified at 302, subgroup data is collected by asking the prospective attendees direct questions about demographics, firmographics, past event participation in the survey 305. The collected subgroup data allows prospective attendees preferred values for subgroups of prospective attendees to be identified. Appendix B contains questions used to create an online survey to collect the subgroup data in one embodiment of the invention. In other embodiments, the event-owner may have access to data regarding prospective attendees subgroups such that it may not be necessary to survey the prospective attendees for all or a portion of the subgroup data.

Figure 4:
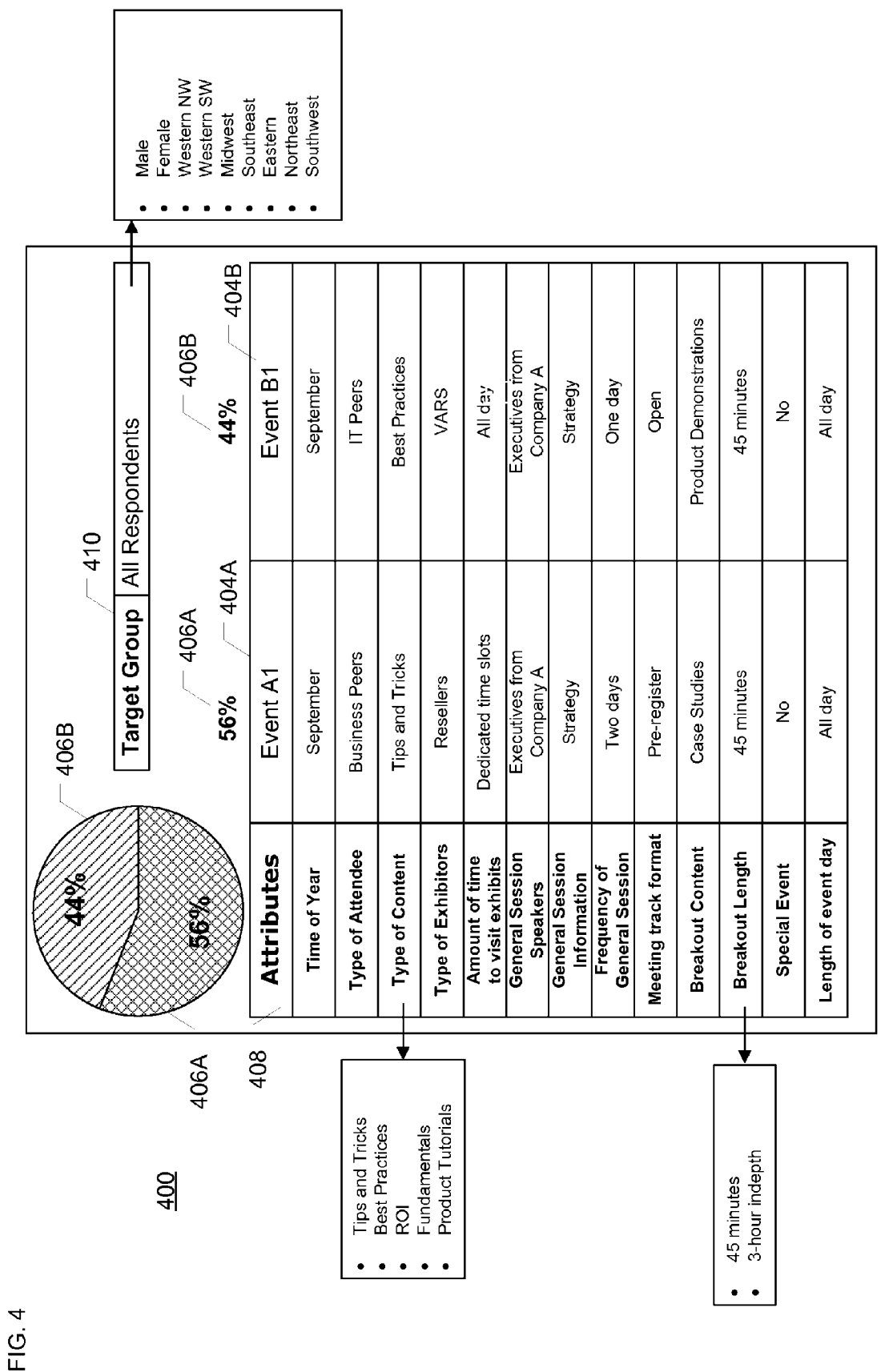
FIG. 4 is a block diagram illustrating a decision support tool according to an aspect of the invention.

After the survey 305 is completed, at 308 the collected prospective attendees preferred values are analyzed via HB-MNL to generate a set of weighted prospective attendees preferred values 309. The weighted prospective attendees preferred values 309 quantify the prospective attendees' preference for a value of an attribute. In one embodiment, the weighted prospective attendees preferred values 309 are used to build a user interface decision support tool 400, as shown in FIG. 4, to simulate the prospective attendees' preference to events with different attribute values. The HB-MNL analysis generates a statistical model that predicts each respondent's choices as a function of the attributes and levels in the experimental design (i.e., as shown in the versions of the survey). The tool 400 is used by the event-owner to simulate the prospective attendees' preferences to potential events. The decision support tool 400 is a conjoint simulation that may be implemented in a spreadsheet or other computer program. The HB-MNL analysis produces utilities which are the raw materials for the decision support tool 400.

In FIG. 3, at 310, a first event is defined. To define the first event, each of the attributes identified at 301 are initialized to a default value. The default value selected for each of the attributes is from the set of potential values identified at 101. In FIG. 4, event A1 404A is one example of a defined first event.

Referring again to FIG. 3, a second event is defined at 311. The second event also includes each of the attributes identified at 301 and the value for attribute is selected from the set of potential values identified at 301. However, at least one of the values selected for one of the attributes of the second event is different then the value of the attribute selected for the first event. Event B1 204B shown in FIG. 2 is one example of a defined second event.

In FIG. 3, at 432, the first and second events are displayed to the event-owner. In one embodiment, the event-owner views the first and second events in the decision support tool 400 shown in FIG. 4. In FIG. 3, at 314, the event-owner is provided with a comparison of the first and second events. The comparison communicates to the event-owner how many of the prospective attendees find more value in the first event compared to the second event. The comparison is calculated as a function of the weighted prospective attendees preferred values 309. In one embodiment, as shown in FIG. 4, the comparison of the first 404A and second event 404B is expressed as a percentage 406. For example, in the comparison shown in FIG. 4, 56% 406A of the prospective attendees find more value in event A1 404A compared to 44% 406B of the prospective attendees who find more value in event B1 404B.

Referring again to FIG. 3, in one embodiment, a first choice rule is utilized for HB-MNL weighted prospective attendees preferred values 309 or utilities. The total prospective attendees preferred values 309 is calculated for each event 404 for each respondent by summing the prospective attendees preferred values 309 for each attribute of the event 404. Using the first choice rule, the simulation predicts that a given respondent would choose the event 404 with the higher total prospective attendees preferred values.

In another embodiment, a logit choice rule is utilized with aggregate prospective attendees preferred values 309 or utilities. Prospective attendees preferred values 309 are summed for a total for each event 404. A prediction of preference of the respondent is calculated as a percentage of the exponential function of each total utility.

At 315, the event-owner is given the opportunity to refine the event comparisons by modifying the values of the attributes and selecting subgroups of prospective attendees. This allows the event-owner to compare various events and select the event that will best motivate the prospective attendees of the event.

For example, if sales have been sluggish in the Midwest sales district, then the event-owner would want to implement a sales event that specifically appeals to prospective attendees within the Midwest. In this example, the event-owner may select a subset of prospective attendees who belong to the Midwest sales district and view the comparison of the first and second events for the selected subset of prospective attendees. In this case, the comparison would communicate to the event-owner how many of the Midwest prospective attendees find more value in the first event compared to the second event.

The event-owner can continue to modify attributes to determine what type of an event will appeal to the prospective attendees at 315.

Referring again to FIG. 3, at 318 the event-owner selects the event to implement. In one embodiment, the event-owner selects the event prospective attendees find the most value in. Once the event has been selected, the program manager implements the event.

The decision support tool 400 is a conjoint simulation that may be implemented in a spreadsheet or other computer program. The decision support tool 400 includes a user interface, such as the embodiment illustrated in FIG. The decision support tool 400 is used by the event-owner to simulate the preferences of prospective attendees to a variety of possible events 404.

Through the decision support tool 400, the event-owner is provided with a comparison of the first 404A and second 404B events. The comparison communicates to the event-owner how many of the prospective attendees find more value in the first event 404A compared to the second event 404B. The comparison is generated as a function of the weighted prospective attendee preferred values 309. In one embodiment, the comparison is shown as a percentage 406. For example, as shown in FIG. 4, 56% of all prospective attendees 410 find more value in the first event 404A compared to 44% of all prospective attendees 410 who find more value in the second event 404B.

The decision support tool 400 also allows the event-owner to refine the event comparisons by modifying the values of the attributes 408 and selecting subgroups of prospective attendees 410. This allows the event-owner to compare various events and select the event 404 that the prospective attendees will most likely attend.

The event-owner may select a new subgroup 410 from the subgroups that were identified during the survey 305. Subgroups 410 help the event-owner to create events that appeal specifically to subgroups of prospective attendees. Once the new subgroup 410 is selected, the decision support tool 400 will recalculate the comparison 406 for the selected subgroup 410.

The event-owner may also modify attributes 408 to determine what type of an event will appeal to the prospective attendees. For example, the event-owner may modify the second event's type of content attribute to "ROI (return on investment)" while leaving the first event's type of content attribute to "Tips and Tricks." The comparison 406 would communicate to the event-owner how many of the prospective attendees find more value in the first event 404A with a ROI content compared to the second event 404B with a tips and tricks content. The event-owner may continue to refine the event comparisons 406 by modifying the values of the attributes 408 until he determines that one of events 404 will best achieve the objectives set in step 104 described above.

In an embodiment, the survey defines Q-sort formatted questions to collect breakout session preferences from a plurality of the prospective attendees. Q-sort is a method of scaling responses in survey research. Q-sort forces participants to rank the items (e.g., reward types) to conform to a quasi-normal distribution. That is, it requires only a very small number of items to receive the highest rating and the lowest rating. It requires larger, but still small, numbers of items to receive the next highest and next lowest rating. It forces the respondent to rate most items in a middle category, so that the resulting distribution of ratings follows the familiar bell-shaped normal curve. For example, for a Q-sort rating of 15 items, the distribution into 5 groups, lowest to highest might be: 1:3:7:3:1. In an embodiment, the breakout session preferences relate to one or more of the following: the content of the breakout session, the format of the breakout session and the speaker type of the breakout session. An exemplary survey template developed in accordance to aspects of the invention is shown in Appendix E.

The collected breakout session preferences are analyzed to determine one or more of the following for potential breakout sessions: the reach of the breakout sessions, frequency of the breakout sessions, and overlap of the breakout sessions. In an embodiment, TURF (Total Unduplicated Reach & Frequency) analysis is conducted on the breakout session preferences to determine one or more of the following for potential breakout sessions: the reach of the breakout sessions, frequency of the breakout sessions, and overlap of the breakout sessions. The TURF analysis calculates optimal configurations for breakout session to maximizing reach. Reach or coverage is defined as the proportion of the audience (e.g., prospective attendees) that chooses a particular option for a breakout session (e.g., roundtable breakout session, scripted presentation breakout session).

Figure 5A:
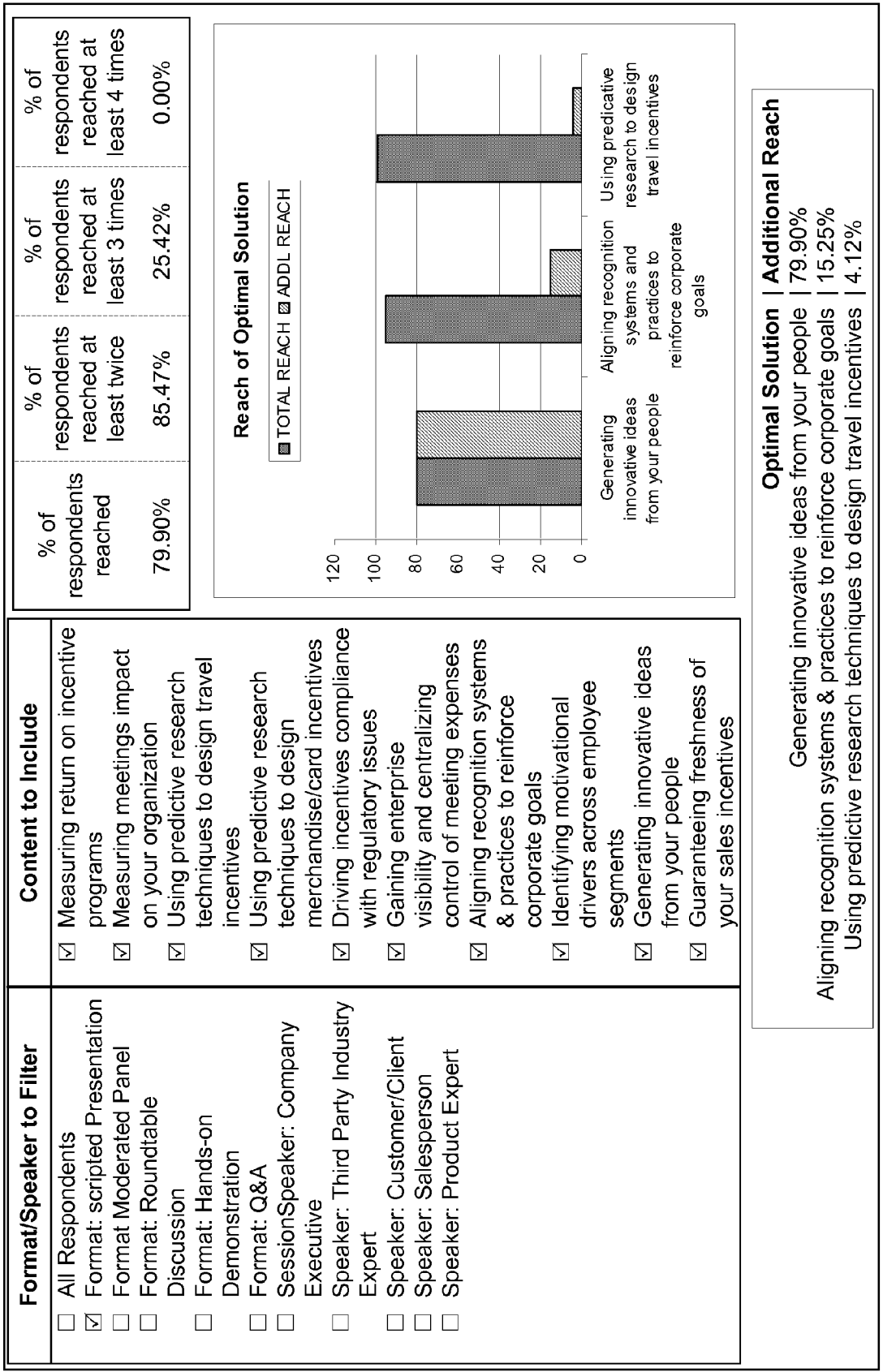
FIG. 5A, 5B are a block diagrams illustrating a breakout session simulation tool according to aspects of the invention.

And, in an alternative embodiment, a breakout session simulation tool is generated as a function of the analyzed breakout session preferences. The breakout session simulation tool includes a user interface, such as the embodiment illustrated in FIGS. 5A, 5B. The breakout session simulator tool may be used for testing the reach, frequency and overlap of potential breakout sessions. For example, in FIG. 5A, the event-owner has selected the breakout session format "scripted presentation" and selected all content. The display shows 79.9% of prospective attendee chose the "Generating innovative ideas from your people" in a scripted presentation format as a first or second preference. By adding an "Aligning recognition systems and practices to reinforce corporate goals" breakout session in a scripted presentation format reaches an additional 15.25% of the prospective attendees. Additionally, 95.16% of the prospective attendee chose one these two types of breakout sessions as a first or second preference.

Figure 5B:
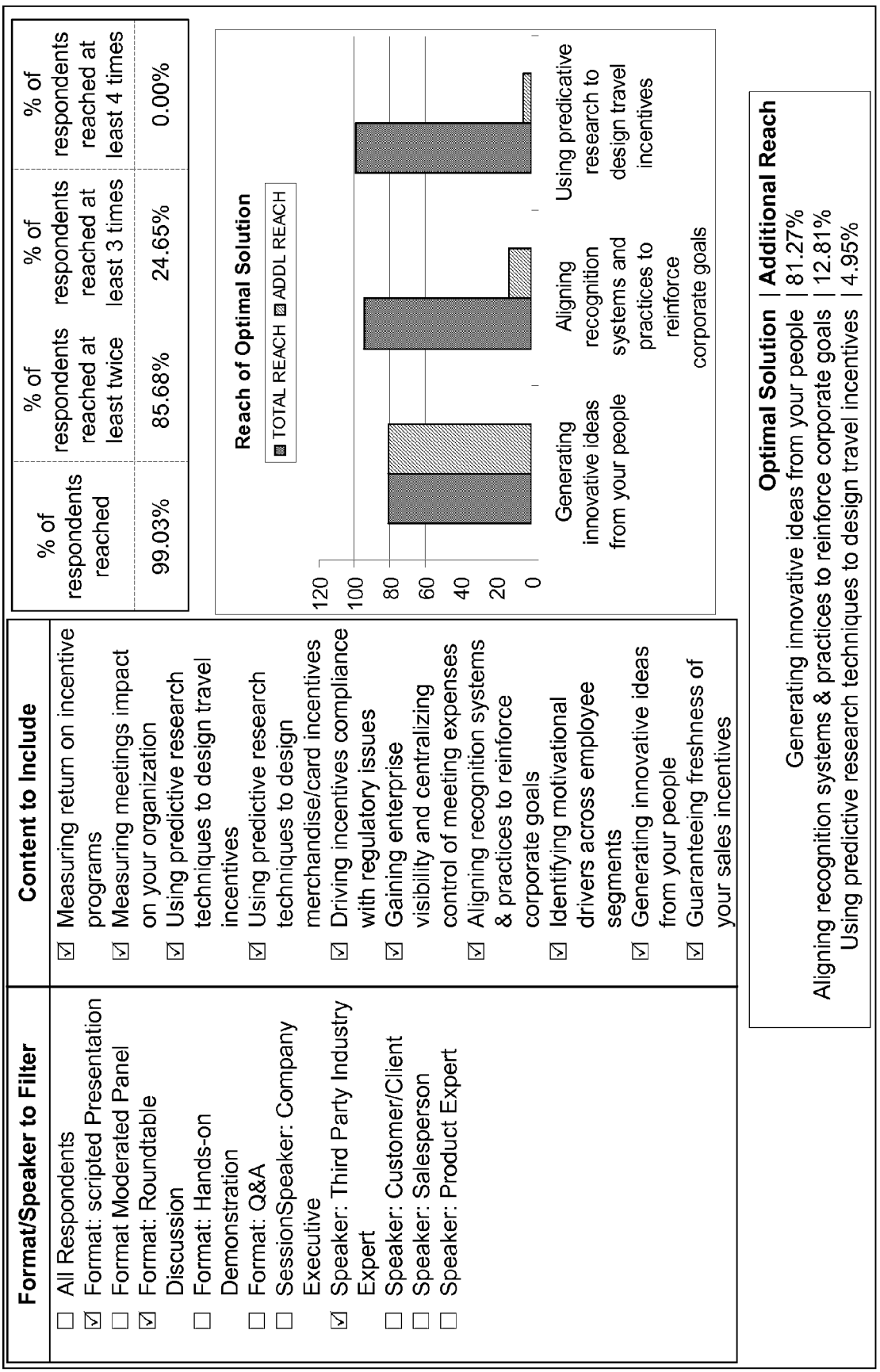

And, in FIG. 5B, the event owner selects the format "Roundtable" and speaker "Third Party Industry Expert" in addition format "scripted presentation" and all content. The display indicates shows 99.03% of prospective attendees chose any one of the breakout sessions in a scripted presentation format or in a roundtable format with a third party industry expert as a first or second preference. Additionally, the display shows 81.27% of the prospective attendees chose the "Generating innovative ideas from your people" in a scripted presentation format or in a roundtable format with a third party industry expert as a first or second preference. By adding an "Aligning recognition systems and practices to reinforce corporate goals" breakout session in a scripted presentation format reaches an additional 12.81% of the prospective attendees.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The attributes listed below are the initial set of attributes intended for use in a pre-event research activity to establish the baseline result for event. The attributes be vetted to include Input from the Discovery Session. For example, issues regarding the special event have not been included on the list.

Prospective attendees will be asked to choose one of the four alternatives from each attribute category. The prospective attendees will be asked to choose the event format they feel would allow them to achieve the highest level of business performance.

| Attribute | Value |
| --- | --- |
| Structured versus Unstructured Time | Morning meetings - unscheduled afternoons, exhibits open |
| | All Day meetings - unscheduled evenings, private functions |
| | All Day meetings including planned evening functions |
| | All Day meetings including working meals |
| General Session - Speakers | Executives of organization |
| | Industry Experts |
| | Product Experts |
| | Third Party Experts |
| | Peers sharing best practices |
| | Public Figures (such as Colin Powell, Lance Armstrong, etc.) |
| General Session - Format | Presentations using presentation software |
| | Video or other multimedia |
| | Scripted presentations |
| | Informal discussions |
| | Panel discussions with moderators |
| | Question and Answer sessions |
| General Session - Amount | Each day |
| | Opening Session Only |
| | Opening and Closing Sessions |
| | Closing Session Only |
| Exhibit Area - Amount | All day - Each Day except during General Session |
| | Break times only |
| | Opening and Closing Day |
| | One Day only (specify) |
| Time Spent In General Session vs. Breakouts | 60% General Session/20% Breakouts/20% Exhibits |
| | 35% General Session/35% Breakouts/30% Exhibits |
| | 10% General Session/80% Breakouts/10% Exhibits |
| | 10% General Session/10% Breakouts/80% Exhibits |
| Meeting Emphasis | Product focused |
| | Market-focused |
| | Sales Techniques |
| | Innovation-focused |
| | Inspiration and Motivation-focused |

APPENDIX B

Meeting Effectiveness
Attributes for Sales Meeting Research Study

I. Conjoint trade-off experiment

This portion of the questionnaire will expose respondents to 16 questions wherein they have to choose which of two sales meeting designs would best help them improve their selling performance. The questions will systematically manipulate the particular combinations of attributes/levels so that we can quantify the value of each level of each attribute to each respondent in the study. An example of one of these questions appears at the end of Appendix B.

| Attribute | Levels |
|---|---|
| 1) Required # overnights | no travel—day meeting only |
|  | 1 night away |
|  | 2 nights away |
|  | 3 nights away |
| 2) Time of Year | Quarter One: Jan - Mar |
|  | Quarter Two: Apr – Jun |
|  | Quarter Three: Jul – Sep |
|  | Quarter Four: Oct - Dec |
| 3) Meeting Venue | Convention Center |
|  | City Hotel |
|  | Resort Hotel |
|  | Airport Hotel |
| 4) Pace of Schedule | Morning meetings – unscheduled afternoon |
|  | Morning meetings - afternoon scheduled leisure activity |
|  | All Day meetings – unscheduled evenings |
|  | All Day meetings with planned evening events |
| 5) National vs. Regional | All Salespeople nationwide |
|  | Division Sales only |
|  | District Sales only |
|  | Local Sales only |
| 6) Attendees | Sales and Sales Management Only |
|  | Add Senior Management |
|  | Add Marketing Support |
|  | Add Operations & Customer Service Mgt. |

7) General Session
   Speakers
                         Company Executives
                         Industry Experts
                         Product Experts
                         Sales people sharing best practices
                         Client testimonials
   (extra-Public Figures)

8) Content for Breakouts
                         Product and Service information
                         Sales Techniques and Skill Development
                         Competitive Information
                         Recognition of Top Performers
   (extra-Inspiration/Motivational Content)

9) Breakout Speakers
                         Company Executives
                         Industry Experts
                         Product Experts
                         Sales people sharing best practices
                         Client testimonials
   (extra-Public Figures)

Sample Conjoint Question

Which of these two meeting formats would most help you improve your sales performance? (Pick one).

|  | [ ]<br>Meeting A | [ ]<br>Meeting B |
|---|---|---|
| Number of nights | 2 | 3 |
| Time of year | Winter | Summer |
| Meeting Venue | Resort hotel | Airport hotel |
| Schedule | Morning meetings, unscheduled afternoons | All day meetings with planned evening events |
| Guest policy | Ability to buy-in one adult guest | Company staff only – no guests |

II. Direct questions
In this section we ask direct questions – we elicit the information we want from the respondents, but we don't build these questions directly into the tradeoff model.

1. What group size would allow for the most valuable sales meeting?
   [ ] 75 or fewer prospective attendees
   [ ] 75-150
   [ ] 150 or more prospective attendees
   [ ] It doesn't matter to me at all 2. Which of the following would you like to have attend the sales meeting?

|  | Yes | No |
   |---|---|---|
   | Include affiliated business partners | [ ] | [ ] |
   | Include other sales channels (internal AND Distributors…) | [ ] | [ ] |
   | Include suppliers | [ ] | [ ] |
   | Only selling team and/or support | [ ] | [ ] |

3. Assuming the meeting is mandated, how far ahead of time should a "save the date" be communicated to avoid conflicts with client meetings?
   [ ] 120 days
   [ ] 90 Days
   [ ] 60 Days
   [ ] 30 Days 4. Please indicate what % of meeting time should be spent in a general session with all attendees, and what % should be spent in breakout sessions. Please make sure your answers total 100%
   General session _____ %
   Breakout sessions _____ %
   Total          100%

5. How often should a General Session including all attendees occur at the sales meeting?
   [ ] Each day
   [ ] Opening session only
   [ ] Closing session only
   [ ] Both opening and closing sessions 6. For best communication, how much should each of these methods of delivery be used during the General Session – Please make sure your answers sum to 100%.

| | |
|---|---|
| PowerPoint presentations | _____% |
| Video or other multi-media | _____% |
| Scripted presentations | _____% |
| Panel discussions with moderators | _____% |
| Q&A sessions (audience asks questions of speaker) | _____% |
| Interactive (Speaker addresses questions and moderates discussion with members of the audience) | _____% |
| Total | 100% |

7. For best communication, how much should each of these methods of delivery be used during the <u>Breakout Sessions</u> – Please make sure your answers sum to 100%.

| | |
|---|---|
| PowerPoint presentations | _____% |
| Video or other multi-media | _____% |
| Scripted presentations | _____% |
| Panel discussions with moderators | _____% |
| Q&A sessions | _____% |
| Informal discussions | _____% |
| Sales modeling/role play | _____% |
| Sharing of best practices/peer to peer panels | _____% |
| Hands-on demonstrations | _____% |
| Total | 100% |

8. Should there be a performance recognition activity as part of the sales conference or not?
   [ ] Yes
   [ ] No → SKIP RESPONDENT TO DEMOGRAPHICS/FIRMOGRAPHICS 9. Which of the following would you most prefer as the format for the performance recognition activity?
   [ ] Formal recognition for top performers, i.e. Final Night Awards Ceremony
   [ ] Informal recognition of top performers at evening event
   [ ] Formal recognition at General Session
   [ ] Recognition at regional/district breakouts or evening functions 10. What are your views on allowing guests attend functions only?
    [ ] Company staff only—no guests
    [ ] Ability to buy-in one adult guest
    [ ] Ability to buy-in one adult guest +/or children 11. In general, what type of training do you find to be the most beneficial/
        Breakout sessions at larger meeting Group training outside of regularly scheduled meetings
Individualized training, delivered to me via my PC 12. As a salesperson, what are the greatest training needs you have?
Sales skills
Product knowledge
Competitive information\positioning

APPENDIX C

Event A 2006
Meetings Effectiveness Study Results

December 2006

Table of Contents

Background and Objectives ............................................................................. 3

Study Design and Response Rates .................................................................. 5

Scorecard Measurements – Results and Findings ............................................ 7

Designed Choice Experiment and "Build Your Own" Exercise ........................ 14

Direct Questions – Results and Findings ........................................................ 16

Management Summary and Recommendations ............................................. 32

Background and Objectives

COMPANY A has successfully managed a high quality User Group Conference, Event A, for many years. This program has provided the company with significant value, both in terms of business results delivered and the opportunity to build a high-performance business culture with its user community.

*While the program continues to perform well, COMPANY A is interested in understanding if there are opportunities to improve the effectiveness and better align the event to business goals and objectives for the COMPANY A.* COMPANY A's situation is similar to other technology companies in that the basic components of its User Group Conference experience have remained relatively consistent over time, but the company recognizes that the people it is trying to attract and the business situation they're trying to influence through the conference continues to change in a very dynamic way.

For example:
- COMPANY A's acquisition of Company B and other companies has changed the attendee mix, their requirements and their expectations of the conference. COMPANY A ran a successful conference for many years, with some repeat attendees but not a high percentage. With more acquisitions, it has become increasingly difficult to maintain the sense of community fostered at previous Event A conferences. There's also an increased desire to incorporate and grow attendance from other user constituents. That is why COMPANY A has made the decision to merge Event A into Event B in 2007.
- A more diverse attendee population regarding roles, titles and purchase decision-makers. All User Conferences have an underlying objective of moving people through the sales pipeline – from awareness to consideration and purchase to implementation and, ultimately, to loyalty and advocacy. The attendee mix has begun to create a greater divide, including a greater number of higher-level decision makers alongside lower-level project implementation team members. The conference content and experience also must shift to appeal to the very separate and distinct attendee segment's needs.
- Improving the "Bang for the Buck" from the Event A Conference. COMPANY A understands the solid value this conference contributes to both its business performance, as well as the development of a strong affiliation and connection to COMPANY A technology solutions. While the value of the event is not in question, it is seeking to understand if there is an opportunity to receive even greater value from this investment as it integrates with Event B.

For many years, COMPANY A has surveyed attendees after the program to determine their satisfaction with various aspects of the event's operation and program design. This information was combined with the requirements and ideas of COMPANY A leadership to design a program that met both business and user community goals from a "gut instinct" and previous experience standpoint. While this approach will continue to be the foundation of program design, in and of itself, it is insufficient for providing the type of insight necessary to address the business challenges previously mentioned.

COMPANY A developed an approach that will provide a greater understanding of the current program:

- What parts of the current program are most effective?
    - How much are attendees willing to trade off one aspect of the conference for another
    - How attractive or useful are potential changes to the current conference design

- What do attendees think about the current conference and how can that information be used to soften the integration of the conference with Event B?
    - What parts do attendees most value, which should not be changed
    - What suggestions do attendees have for improvements

Study Design and Response Rates

A four-part study was implemented consisting of:
- Scorecard measurements to ensure alignment of the event with COMPANY A's corporate goals
- Designed Choice experiment resulting in a 'build-your-own-event' modeling exercise
- Direct questions and demographic/firmographic questions Scorecard measurements were determined following a Discovery Session with key Event A stakeholders in Marketing, Event Planning and Sales. At that time, it was determined the study should explore the differences between the North American Event A conference and the European Event A conference. The goal was to create an experience of "one conference on two continents." Since that time, the corporate environment has changed and that goal is no longer relevant. The decision was made to fold Event A North America into Event B, but retain Event A Europe as a standalone event. The following findings will support the cultural differences to help validate and verify the decision to retain Event A Europe as its own conference.

Information about the conference and corporate goals were supplied by COMPANY A. Invitations to participate in the research were extended to a list of users supplied by COMPANY A. Some names on the list included those who had previously attended Event A as well as some who had never attended but were either qualified prospects considering purchase or current users. Surveys were sent to the same target group both pre-event and post-event. Some of the same questions were repeated (the scorecard and direct questions) in order to compare aggregate shifts in responses before and after the event.

In the North American Study, 30,302 invitations were sent. Of that group, approximately 3 percent opened the email invitation and went to the survey website. We saw approximately the same conversion percentages in both the pre and post surveys. This relatively low conversion rate has been partially diagnosed as communication overload. The email list we used was also used by North American exhibitors and sponsors for numerous communications and promotions aimed at driving traffic to their booths. Verbatim comments we received on-site in Location A support this conclusion.

For example:

"We get SO many emails from exhibitors that it's overwhelming. We don't even pay attention anymore."
- Respondent A "I viewed all the emails like spam or a telemarketer. We don't have enough time to read all of them."
- Respondent B The positive news, however, is that once respondents got to the survey site the click-through rate was a little better than the average typically seen on similar surveys. Of the 920 visitors to the pre-event site, 364 respondents completed the survey. The pre-event click-through rate was 40 percent. The 276 visitors to the post-event site resulted in 80 completed surveys with a 29 percent click-through rate.

The European Study garnered even more favorable results, indicating a slightly more engaged audience in the European community. European Study invitations were sent to 2,304 email addresses. In that group, 4.8 percent opened the email and went to the survey URL. The 110 pre-event visitors to the site brought a 48% click-through rate with 53 completes. Average click-through rates for studies of this nature are typically around 30 percent. After the event, however, the level of interest was even higher. Of the 2,292 invitations, 7.6 percent opened the email and visited the survey website. From the 176 visitors to the site, 78 percent clicked through to complete the study. There were 137 completes in the European post-event study. That improvement in respondent numbers on the post-event survey indicates how much value the European attendees place on the conference.

Scorecard Measurements – Results and Findings

The Event A Scorecard measurements were selected based upon COMPANY A's corporate goals at the launch of this initiative in early 2006. Those goals were determined by a cross-functional team of Event A stakeholders during the Discovery Session. The Event A Event Measurement Scorecard metrics were:
- Acquisition of Product Line A Attendees
- Influence on Intent to purchase Product Line B software
- Influence on Intent to purchase *combined* Product Line B software and Product Line A software
- Event breakeven from a financial perspective

Acquisition of Product Line A Attendees
Until this year, no historical benchmark data existed for number of Product Line A software attendees at Event A. The legacy Company B user community must begin to integrate with the Product Line A software community for COMPANY A to realize the desired synergies between these two groups. Since this initiative was primarily a benchmarking effort, it was determined that even one attendee who identified themselves at registration as part of the Product Line A category would be considered success. For the purposes of our study, 'Product Line A attendees' in both North American and Europe were self-identified as either Product Category A, B, or C.

Results:

- North America = 214
    - Product Category A: 84
    - Product Category B: 130

- Europe = 135
    - Product Category A: 103
    - Product Category B: 32

Influence on intent to purchase Product Line B software – North America
A primary corporate goal for Event A is to increase attendees' intent to purchase additional COMPANY A solutions (or Product Line B software). In order to determine whether or not this conference accomplishes that goal, a pre-and-post event measure was taken of intent by asking the following question: *[Q1. To what extent do you expect Event A to influence your decision to purchase COMPANY A products?]*

As the initial benchmark was unknown, a 5 percent increase in intent attributed to the conference was agreed upon as a successful outcome.

The study found that almost 80 percent of conference attendees said that Event A influenced them at least somewhat to purchase COMPANY A solutions. A <u>14 percent increase</u> was seen from pre-conference respondents' opinions; however, 66 percent said at least somewhat.

Results:

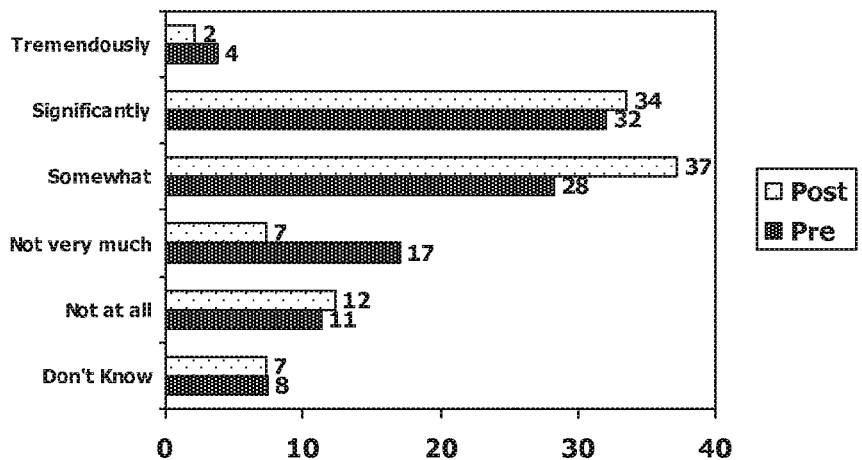

- Goal:     5% increase
- Actual:   14% increase

Additional analysis was done matching the survey respondents' email addresses to information captured during event registration. Information captured included attendees' titles which fell into the following percentages:
- Managers 56%
- Technical 27%
- All Others 17%

We make the assumption that Managers have *purchase decision making power* and technical and others *influence* purchase decisions. Registrants were asked a series of questions, including which COMPANY A technologies they are currently using and what future technologies they are considering purchasing.

We found the responses were unsurprisingly COMPANY A-focused solutions. The leading *current technologies* being used by the respondent group (who also attended the Event A North America event) were:
- Solution Set A

- Solution Set B
- Solution Set C
- Solution Set D
- Solution Set E

We found positive movement to include Product Line A-software focused solutions in future purchase consideration. The leading *future technologies* under consideration from this respondent group (who also attended Event A North America) included:
- Solution Set C
- Solution Set D
- Solution Set E
- Solution Set F

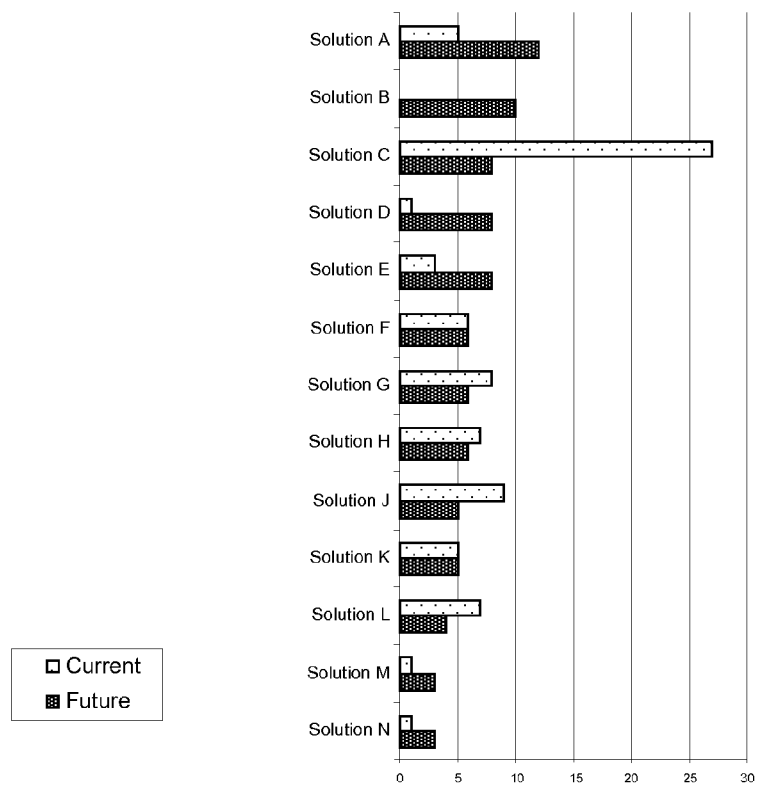

Influence on intent to purchase Product Line B software – Europe

The European conference shared the same scorecard metrics, including the goal to increase attendees' intent to purchase additional COMPANY A solutions. The same question was asked of European respondents pre-and-post event measure to gauge intent: [*Q1. To what extent do you expect Event A to influence your decision to purchase COMPANY A products?*]

As the initial benchmark was unknown, the same 5 percent increase in intent attributed to the conference was identified as a successful outcome.

This study found that almost three out of four post-conference attendees (or 75 percent) said Event A influenced them at least somewhat. That is an increase from pre-conference respondents' opinions, of which 64 percent said they were at least somewhat influenced. This is approximately a <u>10 percent increase</u>.

Results:

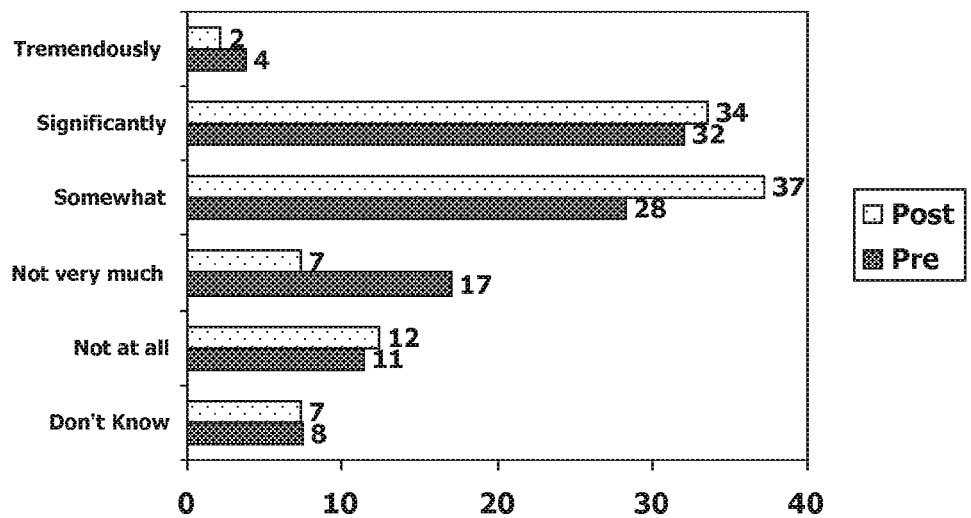

- Goal: 5% increase
- Actual: 10% increase

Influence on intent to purchase combined solutions – North America
A primary corporate goal for the Event A conference is to not only increase the attendee's intent to purchase additional COMPANY A solutions, but to purchase *combined Product Line A and Product Line B software* for their organizations.

In order to determine whether or not Event A accomplishes that goal, a pre- and-post event measure was taken of intent by asking the following question: <u>*[Q13. How much does Event A influence your decision to purchase a converged set of Product Line A and Product Line B software products?]*</u>

As the initial benchmark was unknown, a 5 percent increase in intent attributed to the conference was identified as a successful outcome.

Study results indicate that more than 50 percent of pre and post conference respondents were influenced at least somewhat by Event A to purchase of a converged set of Product Line A and software content products. However, when we looked at respondents indicating "somewhat," "significantly," or "tremendously," there were similar percentages from pre-to-post for this measure.

Results

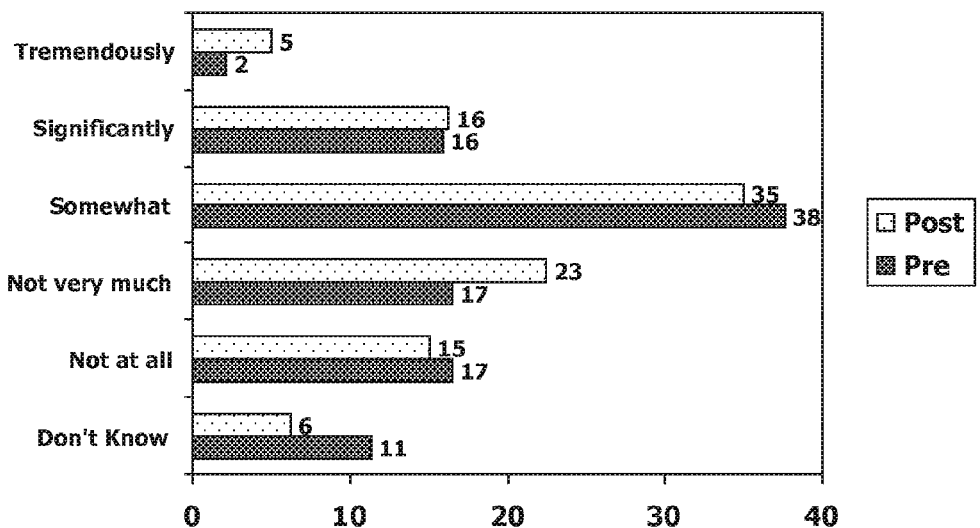

- Goal:     5% increase
- Actual:   0% increase (however, more than 50% positively influenced overall)

In addition, attendees were asked during registration what types of future technologies they were likely to deploy. Of the 1035 attendees responding, a total of *139 selected a combination of Product Line A and Product Line B solutions.*

Influence on intent to purchase combined solutions – Europe
The European conference also shared the corporate objective of increasing combined Product Line A and Product Line B software intent to purchase.

In order to determine whether or not Event A Europe accomplishes that goal, a pre-and-post event measure was taken of intent by asking the following question: [Q13. How much does Event A influence your decision to purchase a converged set of Product Line A and Product Line B software products?]

As the initial benchmark was unknown, a 5 percent increase in intent attributed to the conference was identified as a successful outcome.

Study results indicate that more than 50 percent of European Post conference respondents also say they are influenced at least somewhat by Event A to purchase of a converged set of Product Line A and Product Line B software products. Therefore, half of the respondents indicating influence as compared to 38 percent pre conference indicate a 12 percent increase in intent due to the event.

Results

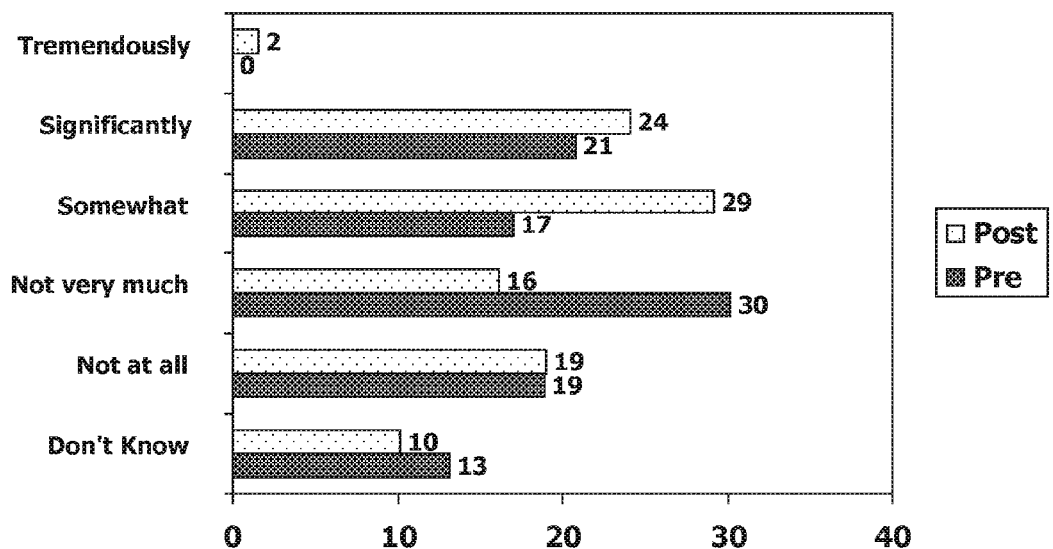

- Goal: 5% increase
- Actual: 12% increase

Designed Choice Experiment and "Build your own" Conference Exercise

When thinking of the Designed Choice research methodology, envision a set of scales. The scorecard and issues of importance 'build' the scales. Then, each attribute is given a "statistical weight". Elements can be added or subtracted to balance out the scales of what is trying to be accomplished through the event.

The "statistical weights" are established using statistical analysis (multinomial logit). That is how the numerical value is assigned to each attribute. Each respondent answers 15 multiple choice questions. These questions are constructed to conform to an experimental design that controls the presence of each meeting element, messaging source and attribute. The statistical analyses of the answers to these questions separates out and quantifies the effect of each event or meeting element, messaging and content delivery format and attribute level. So each piece is placed individually onto our imaginary 'scales.' This exercise determines what event elements we can trade out to create a balanced, attractive event for attendees.

We build the complete model into a decision support system which allows COMPANY A to change event elements, feature sets, etc. and to see the effect on share of preference. (Or, in other words, create a balanced set of scales.) Some initial scenario modeling and analysis was performed on this data.

Conference preference shifts to more than 89 percent – compared to the current conference structure – by making the following five changes:

1. We found that the current format of breakout sessions where speakers use presentation software to present 'to' attendees is not the optimal way attendees prefer to receive information. By altering formats to add panels, open discussions, Q&A sessions and "Ask the Expert" sessions, we create a 71% to 29% shift in preference for the event.

2. Changing the speakers in the General Session from only COMPANY A executives and adding or including Industry experts & Thought leaders creates a 66% to 34% preference.

3. Adjusting the time available to visit exhibits from dedicated time slots (such as during meal functions) to all day creates a 58% to 42% shift in preference.

4. Another significant opportunity to positively affect attendees' preference for the event is in changing the length of the event day. Rearranging the event schedule to allow for two free hours in the afternoon creates a 55% to 45% shift in preference.

5. Finally, there is an opportunity created by allowing prospective attendees to freely select (or build their own agendas). Moving from a pre-registration agenda selection to an open or build-your-own agenda selection, we see a 74% to 26% gain in preference from the current conference.

We will further explore the implications of these simulator findings in the recommendations section of this document.

Direct Questions

There are many issues and opportunities that could only be uncovered by asking a series of direct questions to respondents. Some relate to the conference design and format, some relate to audience acquisition (why people do or do not attend the conference), and other general interest issues.

This section of the report outlines those areas.

Event A as Source of Partners

We wanted to know if attendees use Event A as a source to find partners. *[Q2. Do you use Event A to find COMPANY A partners?]* We found that those who attended the conference are more likely to agree that they use Event A as a source for COMPANY A partners than those surveyed in advance of the conference.

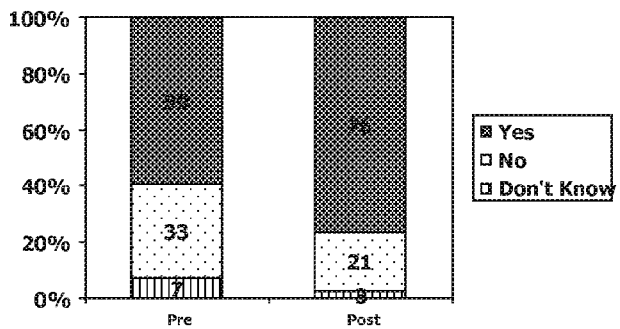

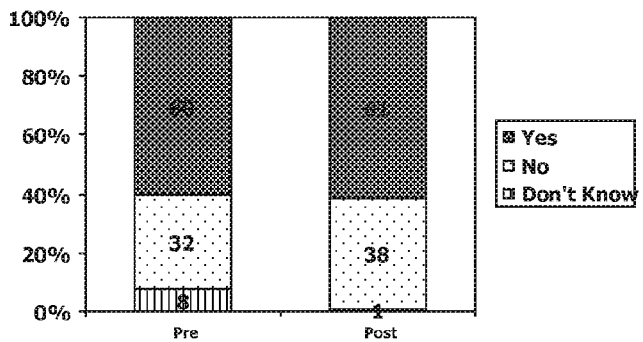

Event A User Communities
We wanted to know whether Event A User Communities were important to attendees. If so, which communities would attendees like to have included.
[*Q3. Please indicate the user communities that you would prefer be included in Event A. (Check all that apply)*]
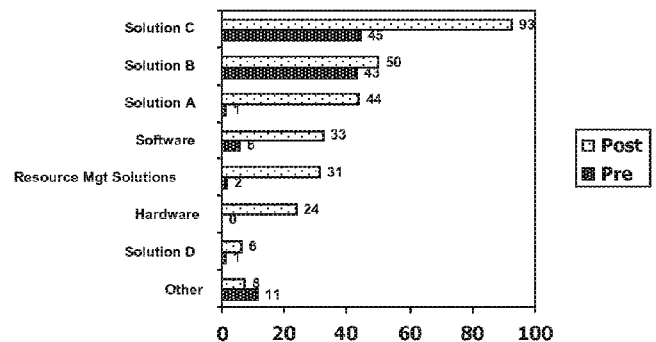
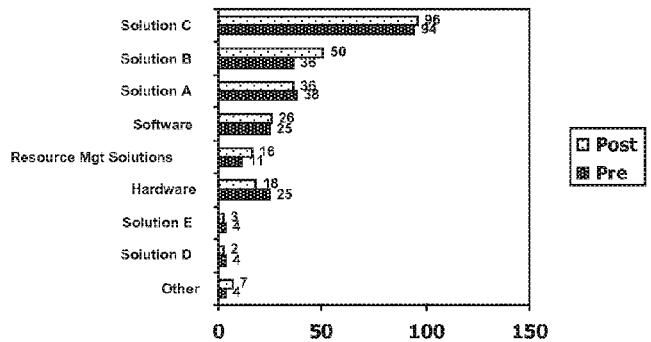

We wanted to know attendees' goals for the event. *[Q4. Which of the following do you consider to be goals of attending Event A? (Check all that apply)]*

It was interesting to note the differences found between North American respondents and European respondents. The top reasons for attending in North America were primarily to network with peers, learn about COMPANY A products, and learn best practices. While in Europe (which is a far less mature market), attendee goals focused on learning about COMPANY A products, best practices and about COMPANY A's strategic directions.

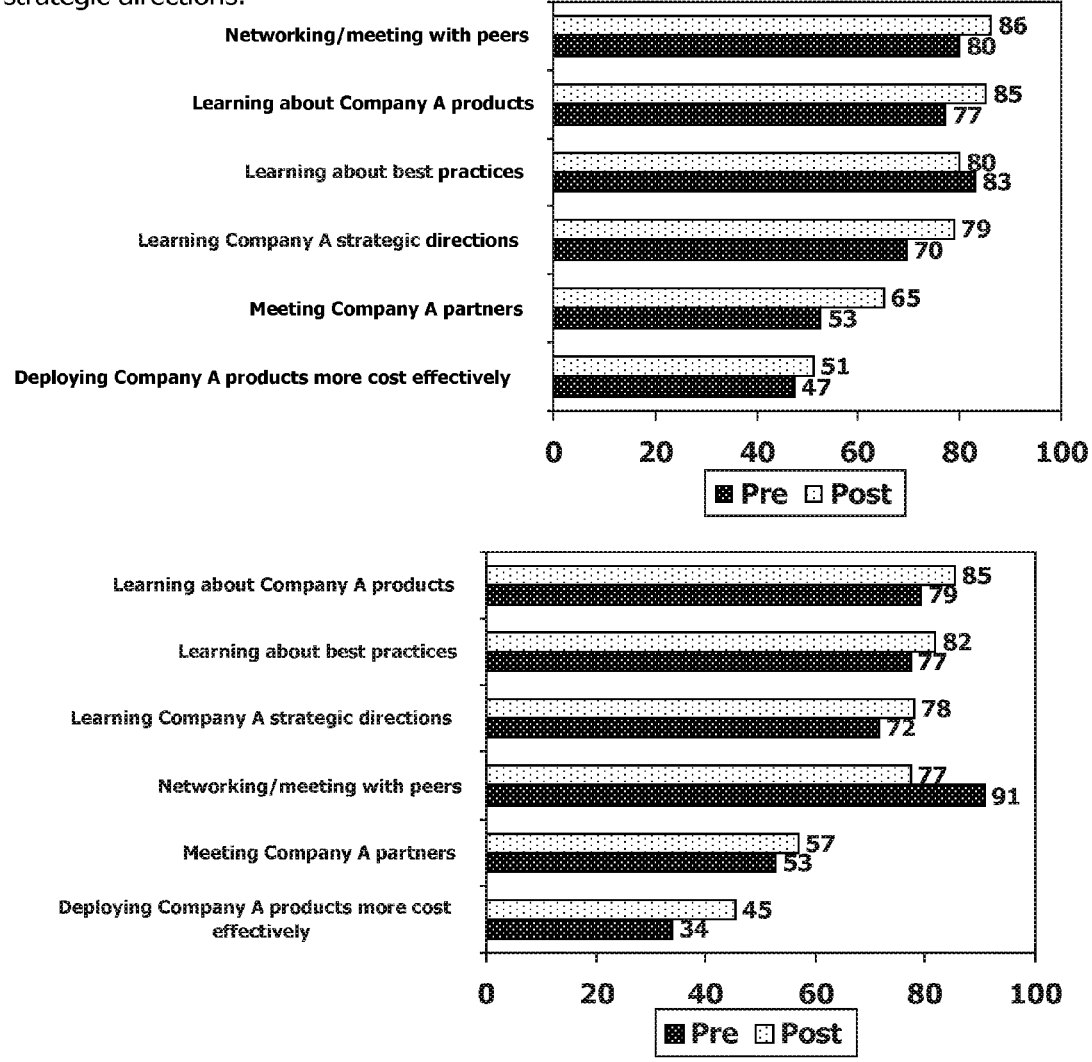

In fact, are a few verbatim comments we heard from attendees in Location A this year:

"I come to learn about products and talk to others who are implementing similar projects."

- Respondent A

"I came because I'm one year into running a Company B shop at Fidelity. I want to talk to people who've been where I am."

- Respondent D

"I like the ease of finding others facing the same challenges."

- Respondent C

"I just want to talk to others who are implementing too. It's not the same as just downloading information from a website."

- Respondent E

And what we were told by attendees in Location B:

"A regionalized approach in country helps bring relevance to implementations."

- Respondent F

"There aren't nearly as many customers speaking in Location B as there were in Location A. I just don't know how everyone uses the product."

- Respondent G

"I liked the customer-led sessions. But it makes more sense by country."

- Respondent H

The implication is that peer-to-peer and social networking issues are far greater in North America. Hearing about COMPANY A products from other customers is of critical importance. In Europe, attendees are looking for more direct COMPANY A corporate messaging and information. They don't necessarily need or want it filtered through peers and other customers or third parties.

Conference Preferences
Regarding Conference preferences and attendee opinions of the event, we asked an additional series of direct questions.

We wanted to know more about how attendees preferred to have their event day 'planned' or scheduled during the conference. *[Q5. Would you want free time built into*

*the event day? Q5a. How much free time would you want built in the event day? Q5b. In what day parts would you want free time built into the day? (check all that apply]*
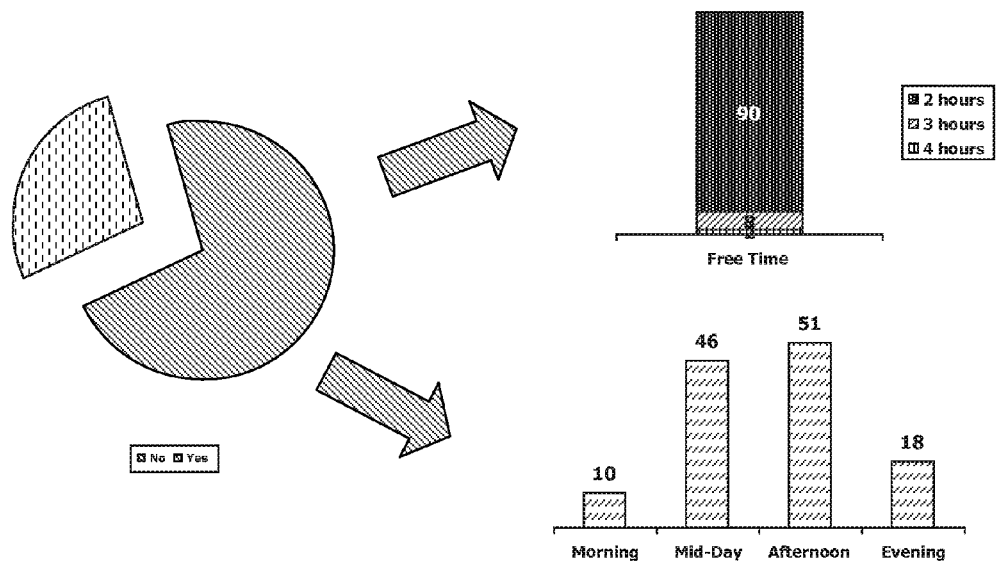
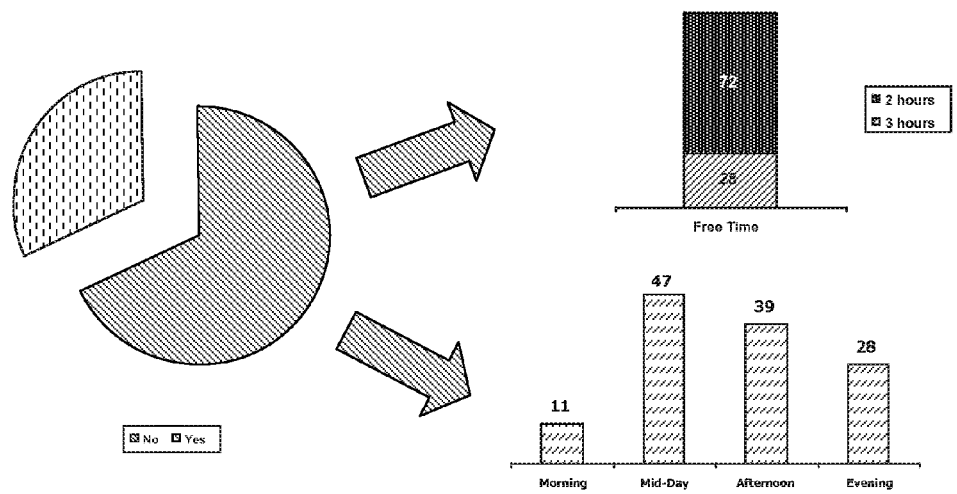

Hotel Influence in Decision to attend Event A

From a list of four factors we provided to them, we wanted to know which held the most influence on attendees' decision to attend the event. *[Q6. Please consider the following aspects of the hotel in your decision to attend Event A. Please rank the factors from most important to least important.]*

We found that how close their lodging was to the actual meetings (conference proximity) and room rates were the most important factors in attendee's decision to attend the event.

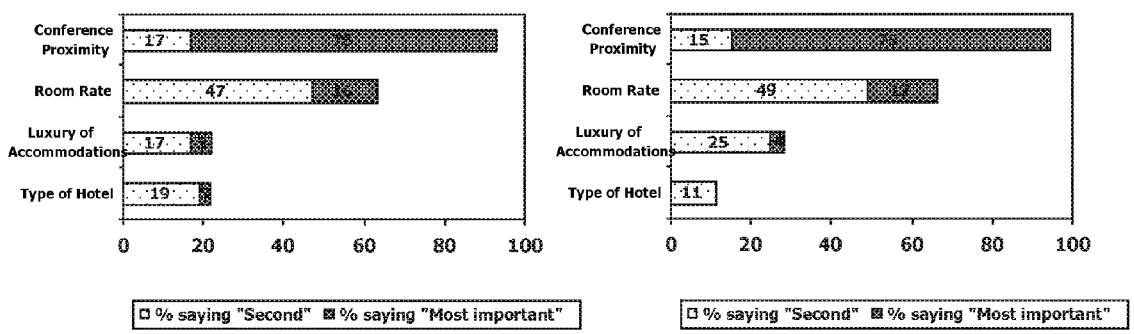

Conference Preferences - Location

Initially, COMPANY A felt that the conference should be held every year in Las Vegas (single location). In order to test that preference with the audience, we asked a series of questions: *[Q7. In terms of location, would you prefer that the conference...*
*Q8. If the conference were to change locations each year, would you prefer that it is held...Q9. If the conference were to change locations each year, would you prefer that it is held.]*

The same question set was asked of both the North American attendees and the European attendees.

The overwhelming response in both studies was that respondents want different locations each year. Specifically, in North America 92 percent would want different locations each year. Respondents also prefer alternating between resort and metropolitan locations, and alternating between the West coast and the East coast.

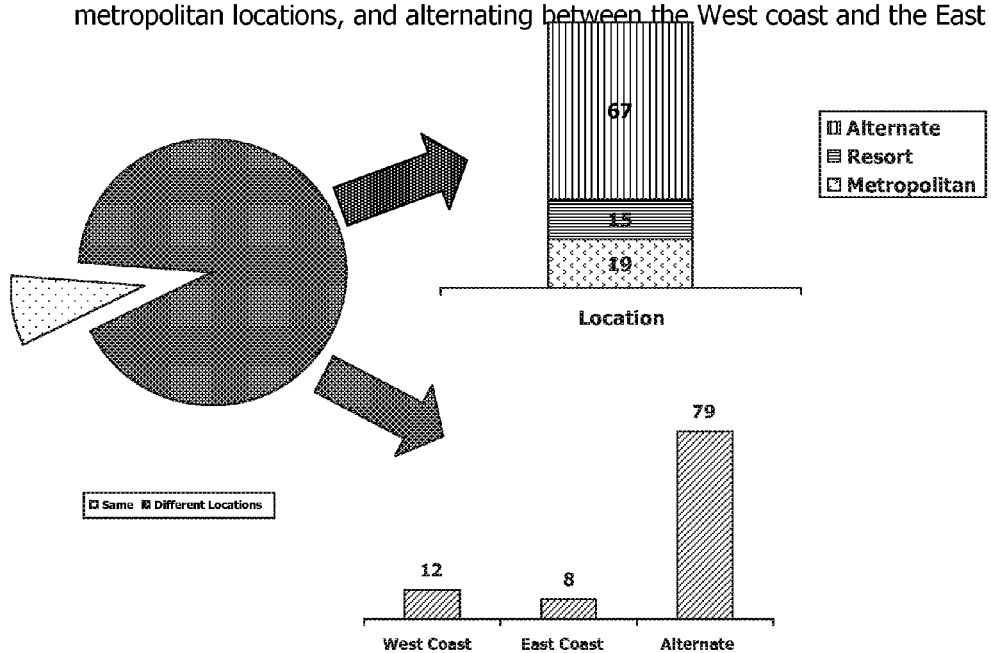

European results mirrored the findings for North America. In Europe, 94 percent want different locations each year. Respondents prefer alternating between resort and metropolitan locations and alternating between Western and Eastern Europe.

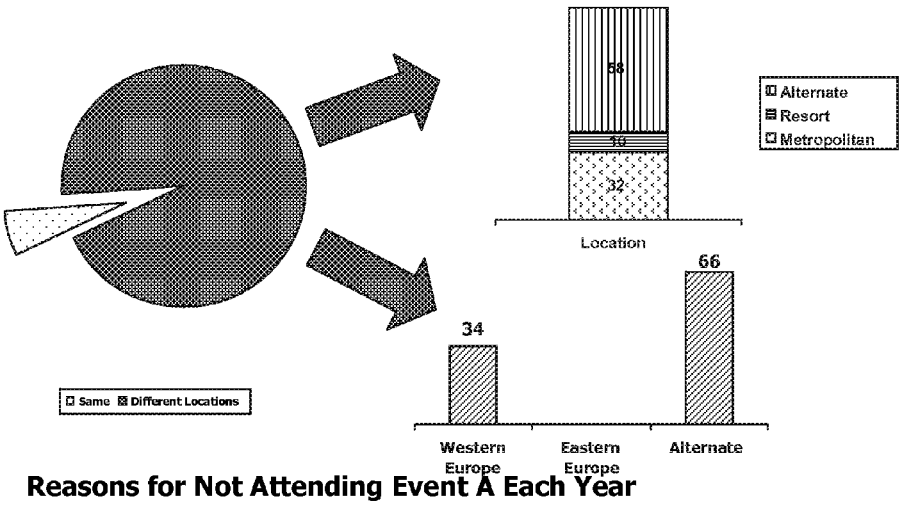

Reasons for Not Attending Event A Each Year

It also was important to understand why Event A does not enjoy a higher repeat attendance rate. Currently, approximately 30 percent of Event A attendance is repeat audience. We asked: *[Q11b. What are the primary reasons you have not chosen to attend Event A every year?]*

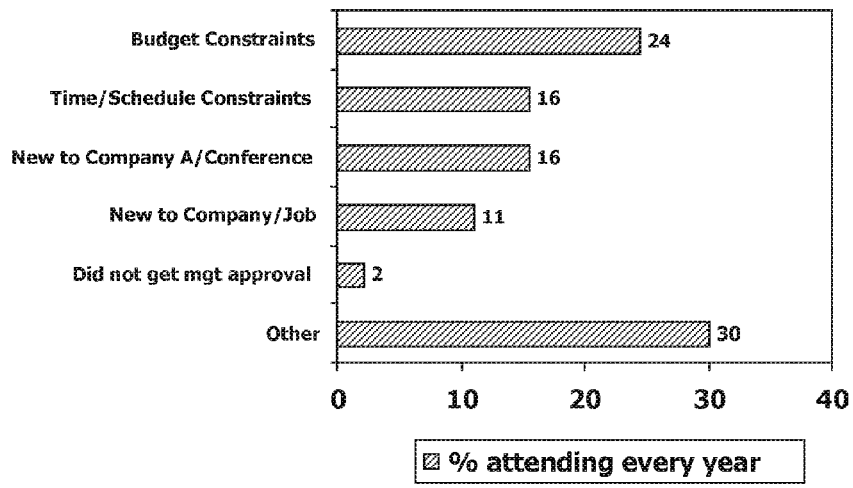

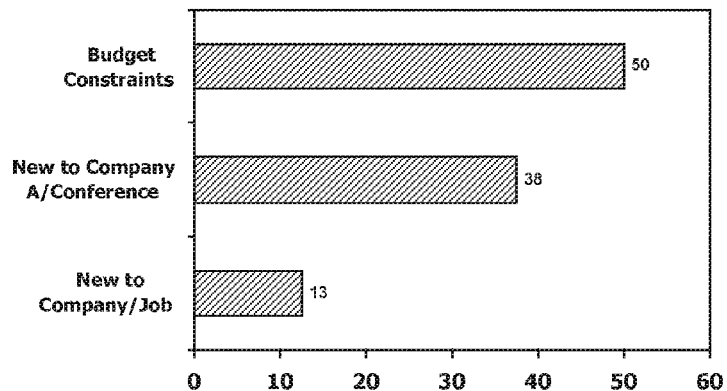

Since "budget constraints" was listed as the number one reason for not attending in both North America and in Europe, we did some additional analysis. We looked at Event A compared to other industry conferences in three key areas that relate to fee structure or the cost of attending the conference:
- Per Attendee Revenue
- Day Passes
- Early Bird Registration

Per Attendee Revenue
We filtered the data according to some considerations that allowed us to match technology user conferences of a size close to Event A (anything with more than 1,000 attendees). We also considered total attendee count, guest attendees, staff, etc. Event A per attendee revenue is slightly higher than the industry average.

- Industry:   $1663
- Event A: $1701.89

Day Passes
We found that the industry trend for user group conferences of a similar size to Event A is increasing in terms of the numbers of day passes sold. The industry is seeing about a 5 percent increase per year in sales of day passes. We filtered our information by average number of day passes compared to all other types of passes (full conference pass, early bird, etc.). Event A is slightly lower than the trend.

- Industry:      4%
- Event A:  2%

Early Bird Registration
Industry trend for attendees taking advantage of early bird pricing is declining (about 15% per year). However, we also saw a decline in cancellations, which indicates that people are making their decisions to attend closer to the conference dates. We found that Event A enjoys slightly higher numbers of people who take advantage of the favorable early bird pricing.

- Industry:      45%
- Event A:  47%

Onsite Verbatims
Information gathered from attendees on-site in both Location A and Location B provided additional context around the budgetary constraints and reasons we don't see more repeat attendance.

> "I would have had my people come instead of me but I can't get corporate approval below Director level. There's just NO travel authorities below Director level."
> -- Respondent I > "Cost is our decision factor. We send one and they bring back the information to the team."

-- Respondent J

"If we go to anything, it's going to be Event A."

- Respondent K

"There are no customers in North America that we want to capture."

-- Respondent L

"We're trying to build our European customer base. We don't really care about North America, but we have a booth for the cost efficiency."

-- Respondent M

"We go to about four shows a year. Event A Europe is always one of them."

-- Respondent N

Reasons for Not Attending Event A Each Year – First Time Attendees
Event A has a high percentage of first time attendees – half of attendees are first-timers. Attendees identifying themselves as first time attendees (during registration) were 592 of the total number of 1,175 attendees (or 50 percent).

As we further analyze that large attendee population, we see that they are more 'implementation or Project Management level' than those we would consider 'decision makers'. This implies that the conference promotions or communications appeal to users who are seeking information, help and community with peers who've experienced or conquered similar challenges to what they're facing.

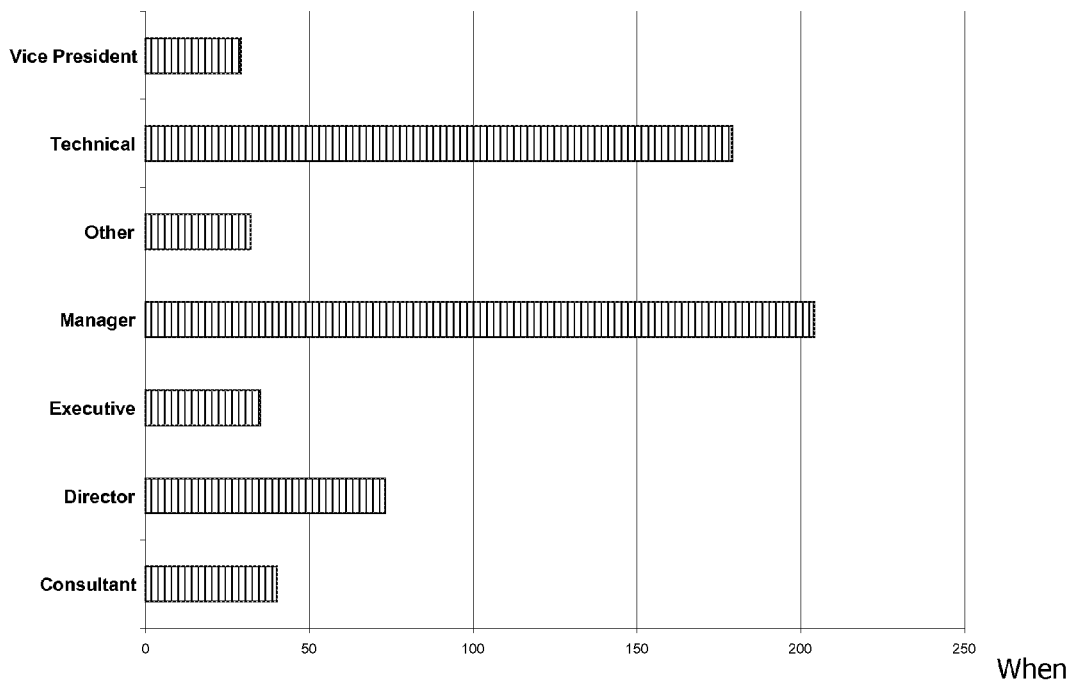

When looking at the job titles of those attending for the first time, the majority of the attendees identified themselves as Technical or Managers. In order to better align with corporate strategy for this event, COMPANY A may want to consider a shift in their marketing and promotion of the event to appeal to a higher-end decision maker. Alternatively, if user loyalty and advocacy become more important organizational priorities, COMPANY A may want to capitalize and expand on the current event format.

Other Conferences Attendee by Respondents – North America
There is no question that corporate budgets for conference attendance are tight. Given that budget constraints were cited as the primary reason for not attending Event A every year, we needed a clearer picture of our competition for those limited dollars. We wanted to know what other industry conferences were attended by our respondent group. Because we did not have a good idea of who our attendees would consider as conference competition, we made the decision to ask the question as open-ended.

As you consider the chart below, you may want to put forward your own logical 'combinations' of responses. For example: Company B conference might be considered in combination with Event A conference. We asked the following questions in order to gather this information: *[Q10. Please list the conferences you consider to be the most important conferences to you. Q10b. How often do you go to these conferences?]*

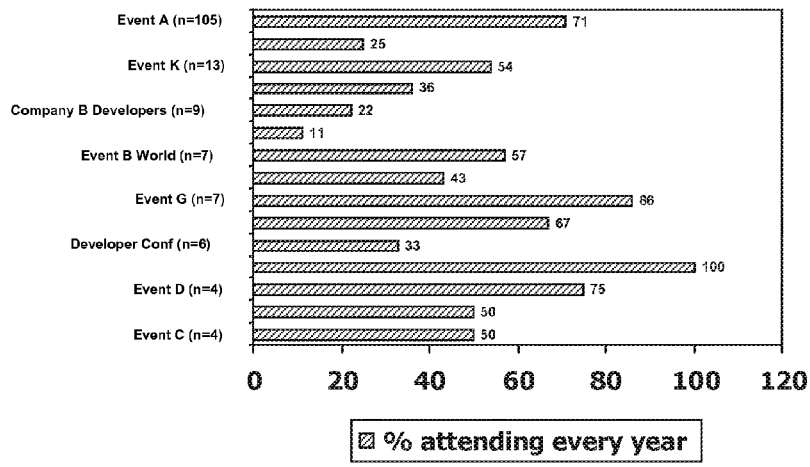

To interpret the chart above, the numbers in parenthesis behind each 'name' indicate the total number of responses we received with that term or 'label'. The bar chart shows that of those responses, that percentage of the total respondent group attends the conference each year. For example, of the 105 people who filled in "Event A" – 71% of them attend each year. Or, of the people who wrote down "Event D" – all of them (100%) go every year.

Other Conferences Attendee by Respondents – Europe

We wanted to get the same picture for Europe, but were constrained by an extremely low number of responses for this question. The question was not required to complete the study; therefore, most respondents skipped the question. Due to the low numbers, we caution that this data is informational only and not statistically valid.

The European study took the same approach as the North American study, asking the question as open-ended. We asked the same two questions in order to gather this information: *[Q10. Please list the conferences you consider to be the most important conferences to you. Q10b. How often do you go to these conferences?]*

| Conference | # Attending | # Attending Every Year |
|---|---|---|
| Event A | 13 | 8 |
| Event A Europe | 4 | 1 |
| Event A USA | 2 | 0 |
| Event C | 2 | 0 |
| Event D | 2 | 0 |
| Event E | 1 | 0 |
| Event F World | 1 | 0 |
| Event G | 1 | 0 |
| Company B Developers | 1 | 0 |
| Event A Las Vegas | 1 | 1 |
| Other | 6 | n/a |

Demographics

We asked a series of questions that helped determine demographics and allowed us to look at the various data sets according to different segments.

The following information describes the demographics of our respondent group.

Location
In the North American Study, all of the conference respondents are from North America, with more than 90 percent coming from the U.S.
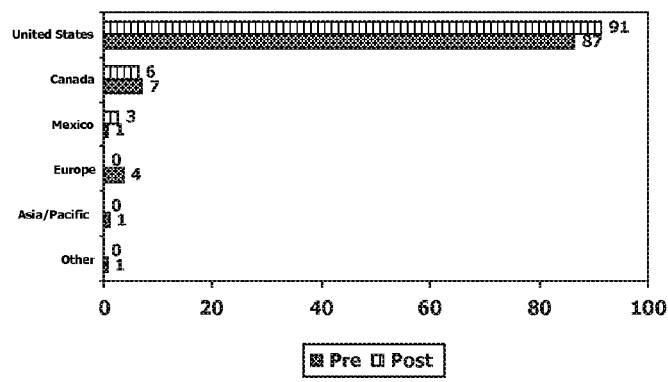
In the European study, the vast majority of respondents came from central Europe.
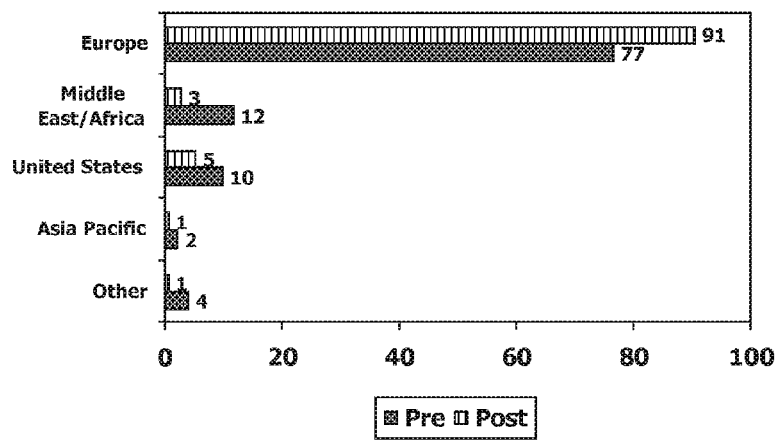

Main Job Function
In North America, IT is the most common job function, followed by Project Lead, Executive/Upper Management and Business Decision-maker.
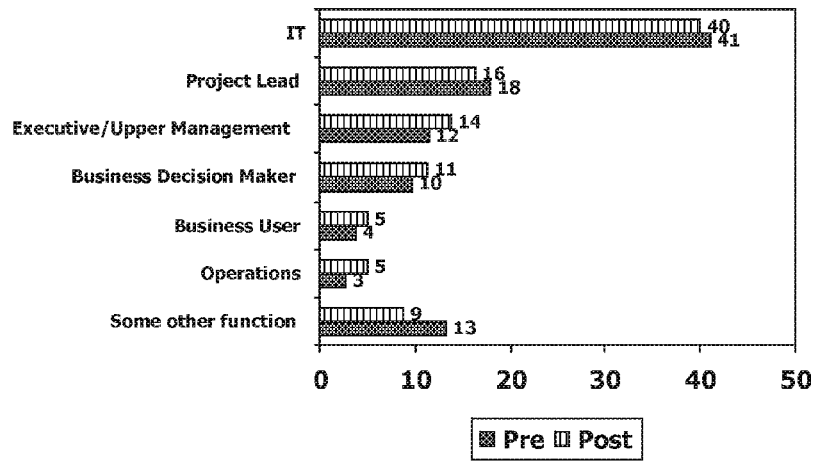
In Europe, we saw a very similar distribution pattern. IT is the most common job function, followed by Project Lead, Executive/Upper Management and Business Decision-maker.
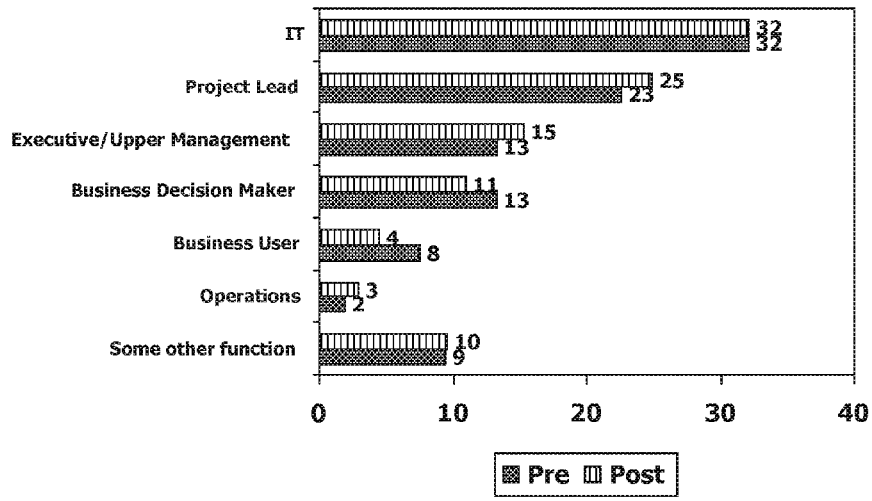

Gender
In North America, 2/3 of respondents were male.
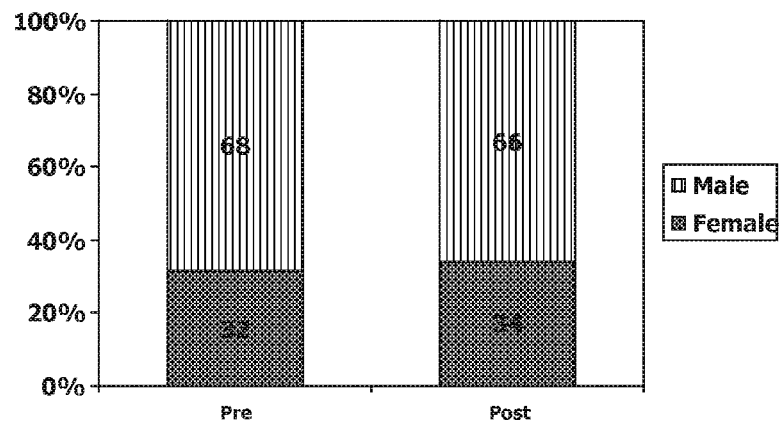
In Europe, the male respondents made up 75 percent of the respondent population.
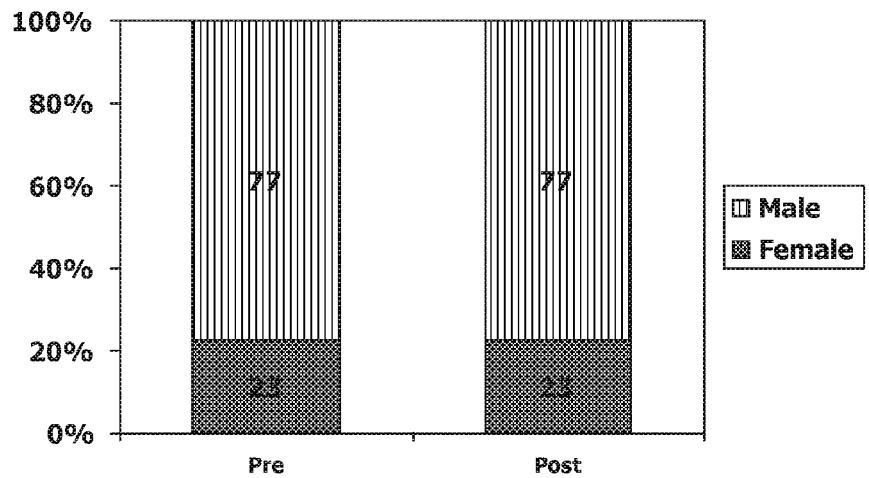

Education
The respondent base was well educated in both the North American and European studies. More than 80 percent of both North American and European respondents had graduated from college.
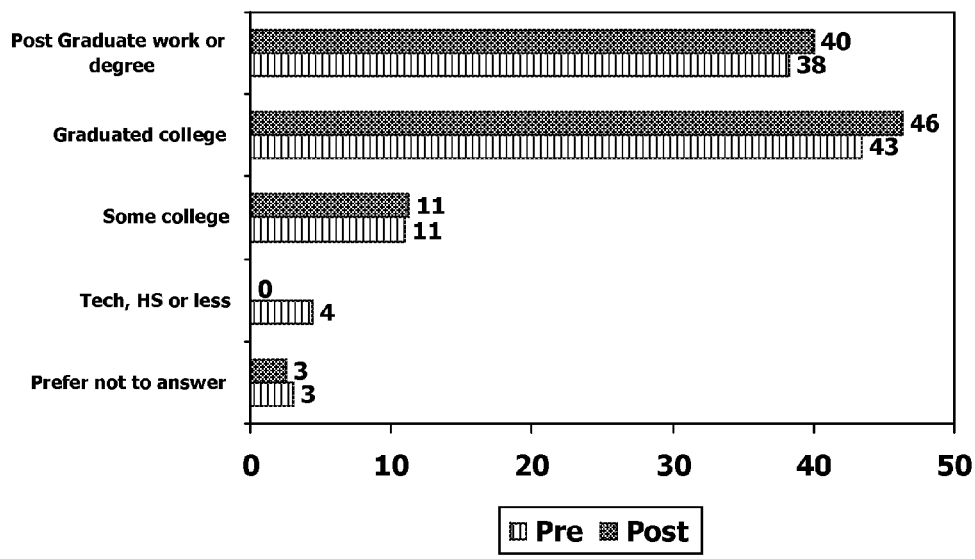
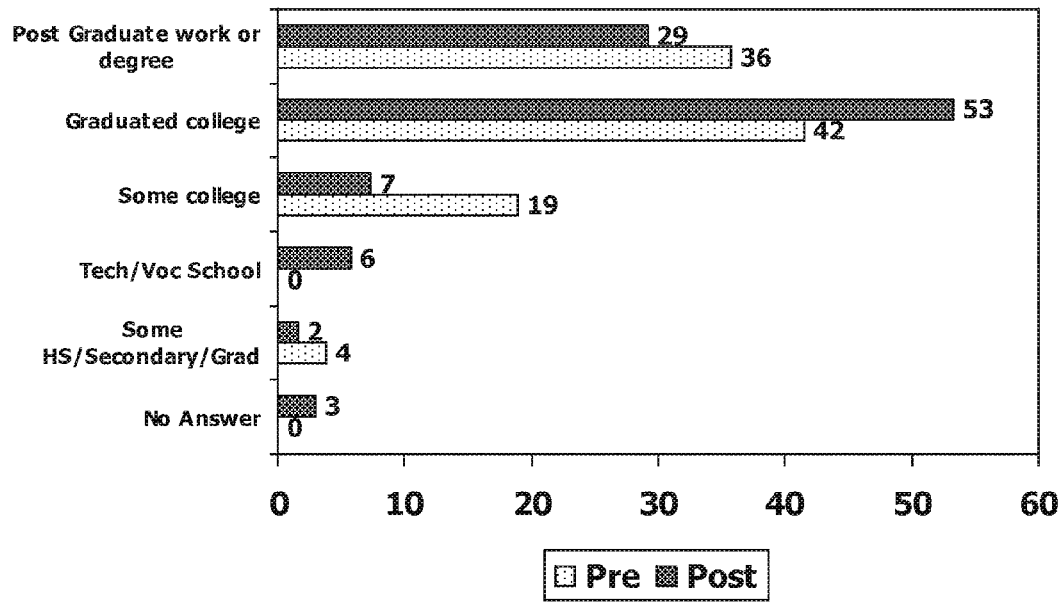

Management Summary and Recommendations

The following pages represent recommendations based upon the study findings.

Scorecard Review

Event A's influence on intent to purchase COMPANY A Product Line B software solutions:

*North American attendees were 14% more likely to purchase additional COMPANY A solutions as a result of attending the event.*

Due to the move from Event A as a stand-alone conference, a similar (14%) bump again next year is a reasonable expectation. A greater increase would not be expected, because the impact of integration with Event B can't be predicted at this point. We now have 14 percent as our benchmark increase from pre-event to post-event when Event A was a stand-alone event. We recommend continuing to track and monitor this information to gauge the impact of that event integration.

If there is a desire to increase the efficacy or significance of this measurement, COMPANY A might consider creating a connection between the self-reported "intent to purchase" and their actual internal sales pipeline data or COMPANY A's corporate revenue tracking systems.

Additionally, this benchmark measurement offers a window into the legacy Event A community. We recommend continuing to track using the same yardstick or measurement initiative to allow for comparison of behavior before and after Event A's integration with Event B.

Event A's influence on intent to purchase a combined content and Product Line A software solution set.

*North American attendees showed no movement pre-to-post in intent to purchase a combined solution set.*

With Event A moving into Event B, greater increases in intent to purchase combined Product Line A and Product Line B software solutions would be expected. By placing these individuals into an environment that showcases the obvious synergies in the combined software solutions, the benefit should translate to increased purchase intent. We also would anticipate that COMPANY A would want to track the impact of the more obvious messaging regarding the advantages of using COMPANY A's Product Line A and Product Line B software.

The benchmark work that we have done in 2006 allows us to understand the legacy Event A mindset and, in some cases, behavior.

It would be advisable to have a similar picture of mindset and behavior tracked from the legacy Product Line A software attendees. We would recommend continuing this benchmark work to create a snapshot defining where each segment stands as the conferences blend the two communities. Said another way, the work we've begun gives us the 'before' picture. Continuing to monitor the impact of integration of this community with the legacy Event B community provides validation or illumination around the combining of these two conferences.

Event A's ability to attract Product Line A software attendees.
*This metric is no longer meaningful in its current form.*
We recommend continuing to track the 'audience mix' of legacy Event A vs. legacy Event B attendees. The benefit is in creating richer, deeper profiles of each segment. This profile information will help ensure the messaging, communications, invitation and event experience is optimized for the needs of each group. Continuing to profile and examine each segment ensures understanding of how to make each community feel important so they remain committed to attending the event annually.

Destinations

Respondents indicated an overwhelming preference to alternate between cities in North America – East coast to West coast. They also indicated that they prefer to alternate between metropolitan and resort type venues. The attendance size of Event B limits both destination and venue options. The following cities on the East and West coasts are those that we have identified that fit future conference needs.

- West Coast: San Francisco, San Diego, Las Vegas, Location A, Denver, Seattle
- East Coast: Orlando, Chicago, Dallas, Boston, Atlanta, San Antonio, Philadelphia, Washington D.C.

We recommend that COMPANY A pursues several multi-year contracts with the cities identified. Pursuing multi-year contracts with skip patterns (for example: Orlando in 2007, Las Vegas in 2008, Dallas in 2009, San Diego in 2010 then back to Orlando again in 2011 and Vegas in 2012... contracting for both 2008 and 2012 in Las Vegas at the same time creates negotiating opportunities.)

Venues

Respondents indicated an overwhelming preference to stay in hotels that are close in proximity to where the conference meetings and events are held.

We recommend that COMPANY A hold out or 'reserve' several of the closest hotels for legacy Event A attendees. This allows COMPANY A to schedule Event A-only receptions and special conference sessions with deep-dive content aimed specifically at the legacy Event A community.

One of the 'fears' Event A attendees expressed regarding integration with the larger Event B is that they would be unable to 'locate' their peers and other members of their community. By housing Event A attendees at one or two hotels, it alleviates their short term 'fear' of being lost in the larger conference environment. This also will soften their integration to Event B, and allow them a sense of maintaining their smaller conference environment.

Event A at Event B Hotel Examples...

| HOTEL | DISTANCE FROM CONVENTION CENTER | DISTANCE FROM AIRPORT |
|---|---|---|
| Hotel A 1334 rooms | 1 minute | 12 minutes |
| Hotel B 833 rooms | 1 minute | 10 minutes |
| Hotel C 768 rooms | 2 minutes | 15 minutes |

The Event A community would be able to see the Event A-designated hotels by "filter" through the registration process.

Networking and building communities
Respondents indicated a desire for two hours of free time built into the day at mid-day or early afternoon. We would recommend extending lunch hours and not scheduling afternoon sessions between the hours of 11AM – 2PM.

In consideration for those attendees who would like to fill those hours with business or conference-related activities, include an optional 'networking lunch' that's mutually scheduled based on topics of interest. There are registration tools available that facilitate arranging these on-site meetings. The tools filter by topics of interest and other profile matching, to send calendar requests that are compatible with corporate calendar software. COMPANY A benefits from the additional profile and segmentation information gathered through the tool. COMPANY A also has new visibility in identifying who influences that legacy Event A community.

Creation of Extended Event A Communities using Blogs
Peer and third-party validation emerged as important to respondents in content and choices for speakers. We know from on-site interviews and experience with the conference over time, that the networks created at the conference are very important to attendees.

In order to foster and sustain the sense of Event A community, we encourage the creation of virtual user-community blogs – perhaps initiated by advocate customers. In order for this social networking to succeed, however, it must have the appearance of being generated by the community itself and not 'sponsored' or authored by COMPANY A.

Currently, if you Google "Company B blog" or "COMPANY A blog" results are things such as:
- http://www.ablog.com   A blog about industry (not favorable towards COMPANY A)
- http://ablog.Company A.com/   A blog created by COMPANY A, with COMPANY A letterhead – (won't be considered peer or third party)
- http://www.bblogs.com/   Attendee A's portal (musings about presenting at Event A 2006 in Location B)

The trend towards this social networking is continuing to grow. We recommend that COMPANY A take advantage of this powerful social media tool to favorably extend advocate communities and relationships that develop on-site. The benefit to COMPANY A is positive communications from valued peer sources in the user community.

Meeting "Elective" Session Recommendations

The Event A Decision Support Simulator results indicate a preference for personal scheduling of elective sessions and more individual control over on-site time management. We recommend that COMPANY A keep all sessions open and offer a build-your-own schedule option.

Using this system to create personalized schedules for each attendee allows COMPANY A to gauge content interest and monitor by attendee type whether the preferred tracks and sessions match those selected by a particular group. COMPANY A will therefore be able to facilitate more informed decision-making prior to the conference start as it relates to space allocations, topic interests, and message adoption by the various attendee types.

Frequency of General Session

The Event A Decision Support Simulator results indicate a desire for General Sessions to occur on opening of each of the three days plus lunch. We recommend shorter but more frequent General Sessions that include third-party sources as speakers validating COMPANY A's messages.

The benefit to COMPANY A comes through more "bang for the buck" by extending the investment in staging and production for the General Session. It also increases the organization's credibility through outside source validation of COMPANY A's messages.

Sponsor Communications

The difficulty we experienced in the lack of conversion on survey emails was partially diagnosed as 'communication overload.' All exhibitors and sponsors receive the same email lists for all of their promotions. Eventually, their targets simply ignore the attempts to get their attention. We recommend consolidating all exhibitor correspondence into a single mailing or portal.

Consolidated sponsor communication allows for more focused capture of attendee mindshare. Attendees select what interests them and create "pick lists" of preferred exhibitors to visit. We also can use the same electronic matching or scheduling system employed for peer-to-peer onsite meeting scheduling. Attendees 'shop' through the electronic system and send requests to arrange focused time on site with exhibitors – further explanation is offered in the next recommendation.

The benefit to your sponsors is they get more qualified traffic from their investment. Sponsors can receive reports outlining 'click-through' interest so their follow-up is more targeted to attendee's areas of interest.

Extend Exhibit Hours

Respondents indicated a desire for access to exhibits all day long, or at their leisure instead of only during meal functions or designated periods of time. In order to make the most of those extended exhibit hours, we recommend using the same electronic matching (described above) and in the lunchtime networking section of this report. This allows attendees control over scheduling time with exhibitors and sponsors before they arrive on-site. The system allows attendees to build opt-in profiles that match to exhibitor offerings. They can then determine whether they would like to send 'calendar requests' for time to talk at booths. This program would be used in conjunction with the "build your own agenda" utility.

The benefit to sponsors is, once again, optimizing their investment in more targeted and qualified customers seeking 'partners' that match their offering.

Audience Analysis

Based on the demographic and firmographic information collected during registration, an audience analysis was conducted using a standard sales cycle model. This model uses demographic and firmographic information to place attendees into segments within the sales pipeline. The segments correspond to these common definitions of a sales cycle or sales pipeline:
- Awareness
- Knowledge
- Consideration
- Selection/Trial
- Loyalty
- Advocacy Based on the data collected during registration, two segments were identified as important relative to COMPANY A's event scorecard growth goals. These two segments are those who have the greatest effect on new or extended purchase of COMPANY A product. The segments are:
- Existing Attendees Considering Additional Components
- New Attendees Deploying Current Products We defined the segment "Existing Attendees Considering Additional Components" as:
- Multiple Event A conference attendees (more than one conference)
- Users of at least one current solution
- In consideration for at least one future solution.

We defined the segment "New Attendees Deploying Current Products" as:
- First-time Event A attendees,
- Users of at least one current solution The next two graphics show the audience analysis matrix for North America and Europe:

North America
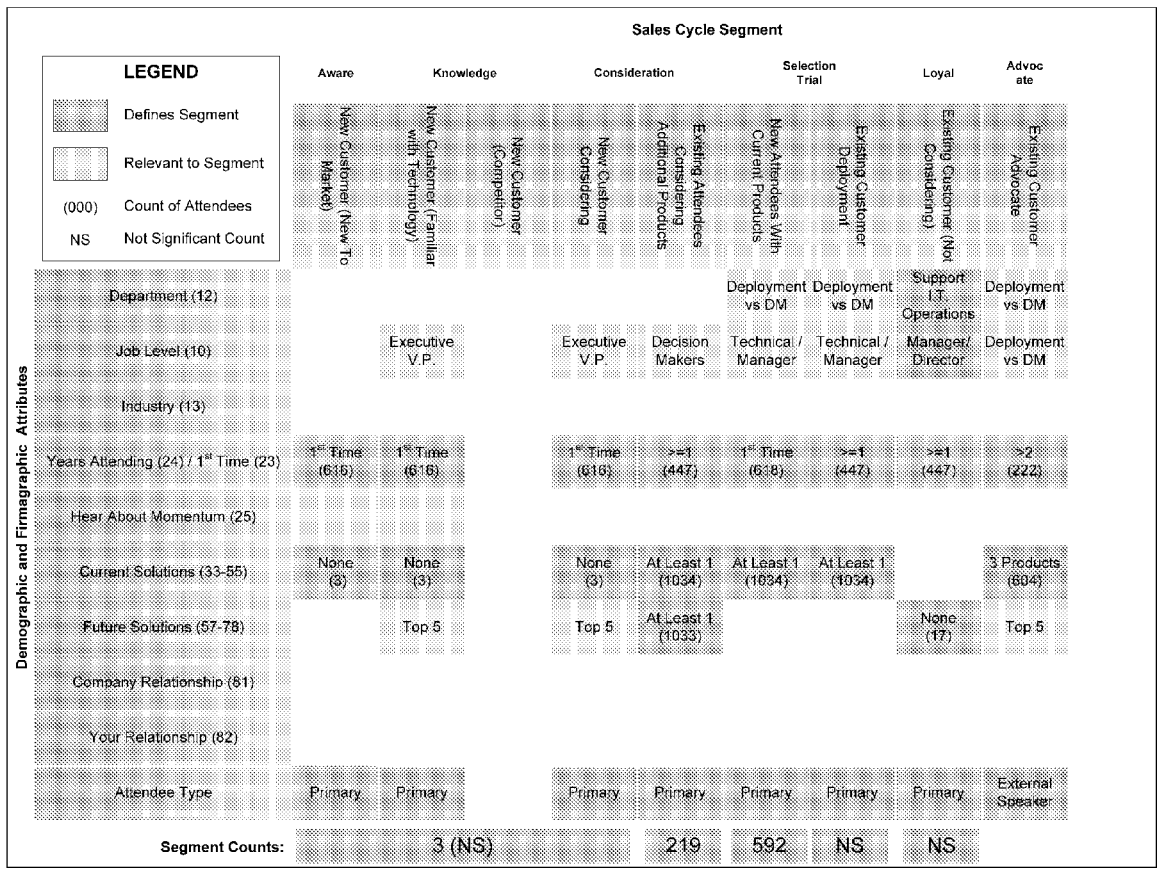

Europe
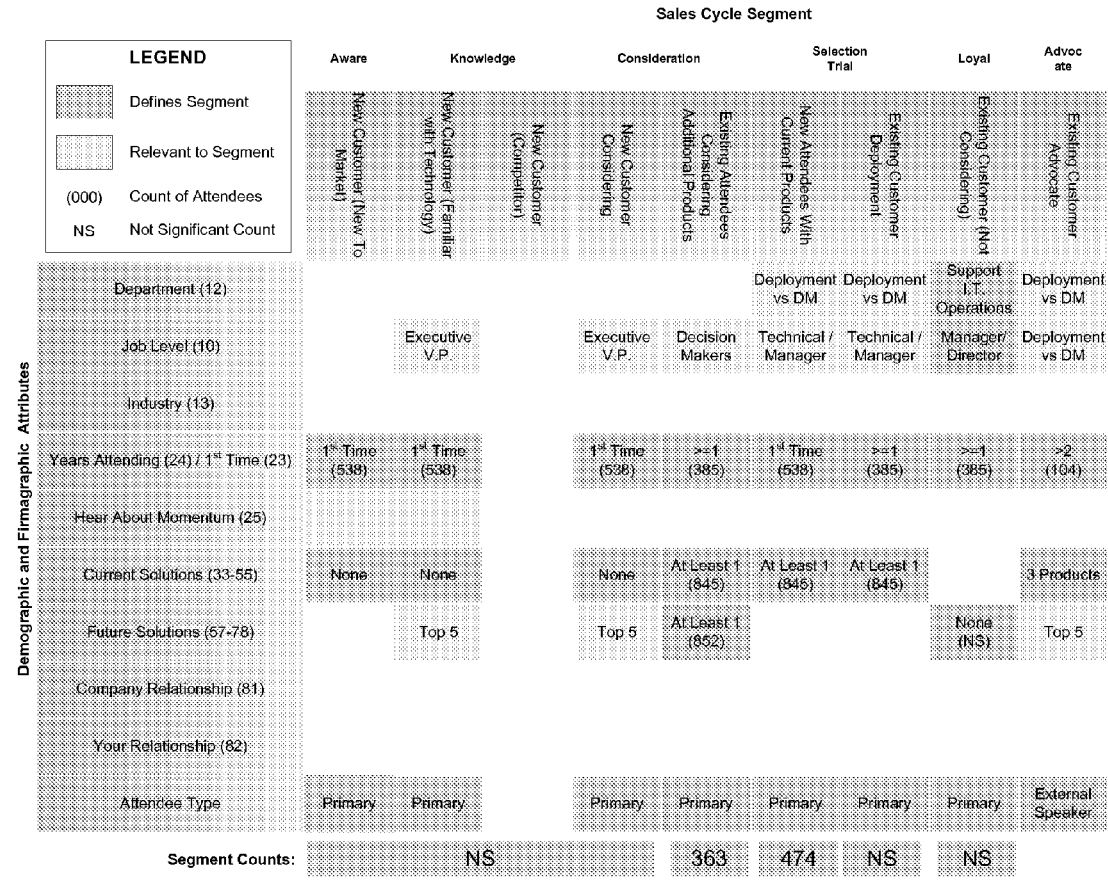

Existing Attendees Considering
This segment represents those attendees who have attended Event A more than once and are considering additional COMPANY A technologies. Of this group, the solutions they are considering are identified below:
North America:
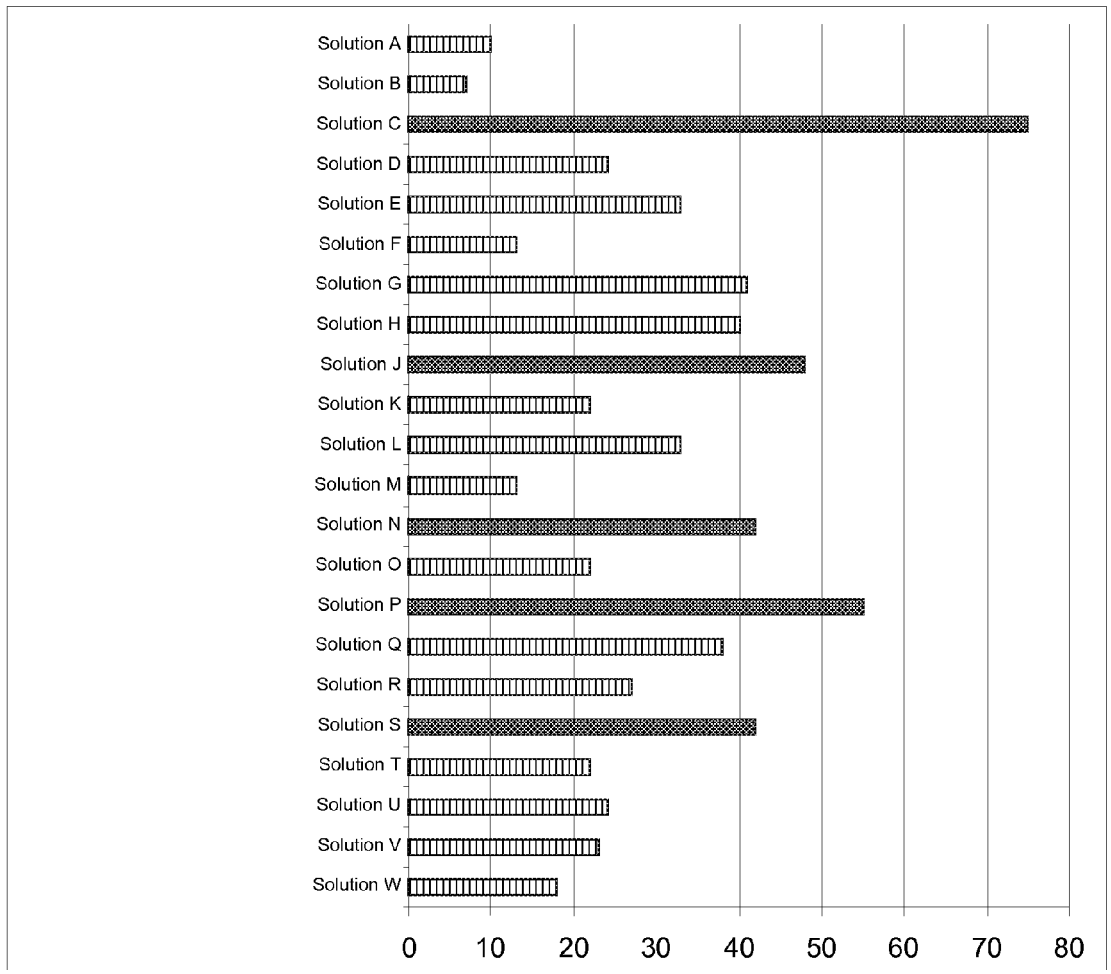

Europe:
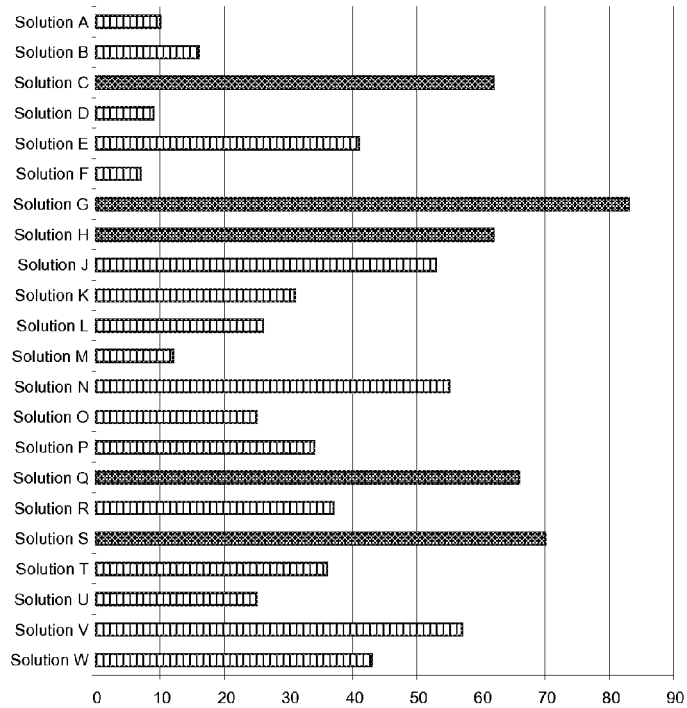
As with the North America general attendee population, this group represents mostly technical and managerial job levels:
North America:
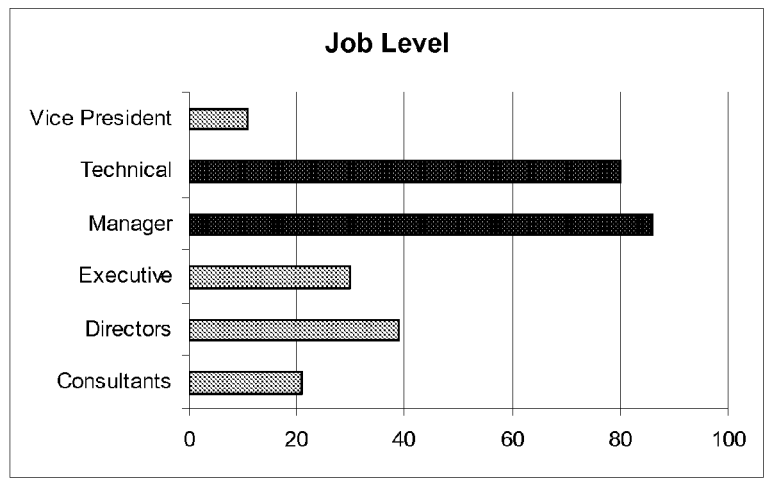

Europe:
This group represented mostly managers for the Location B program.
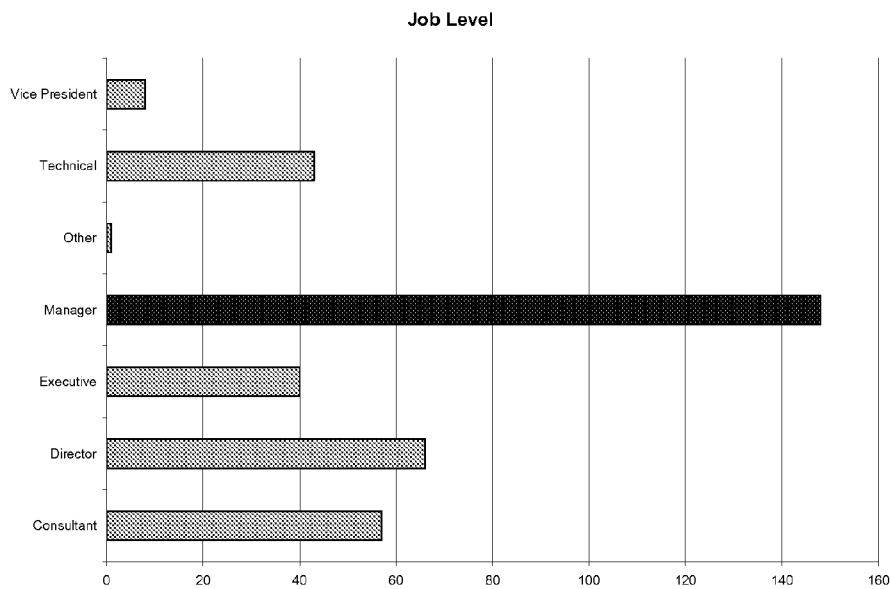

New Attendees Deploying Current Solutions
This segment represents those attendees new to Event A with at least one current solution. The lists of current solutions new attendees are deploying differ greatly from those existing attendees are considering:
North America
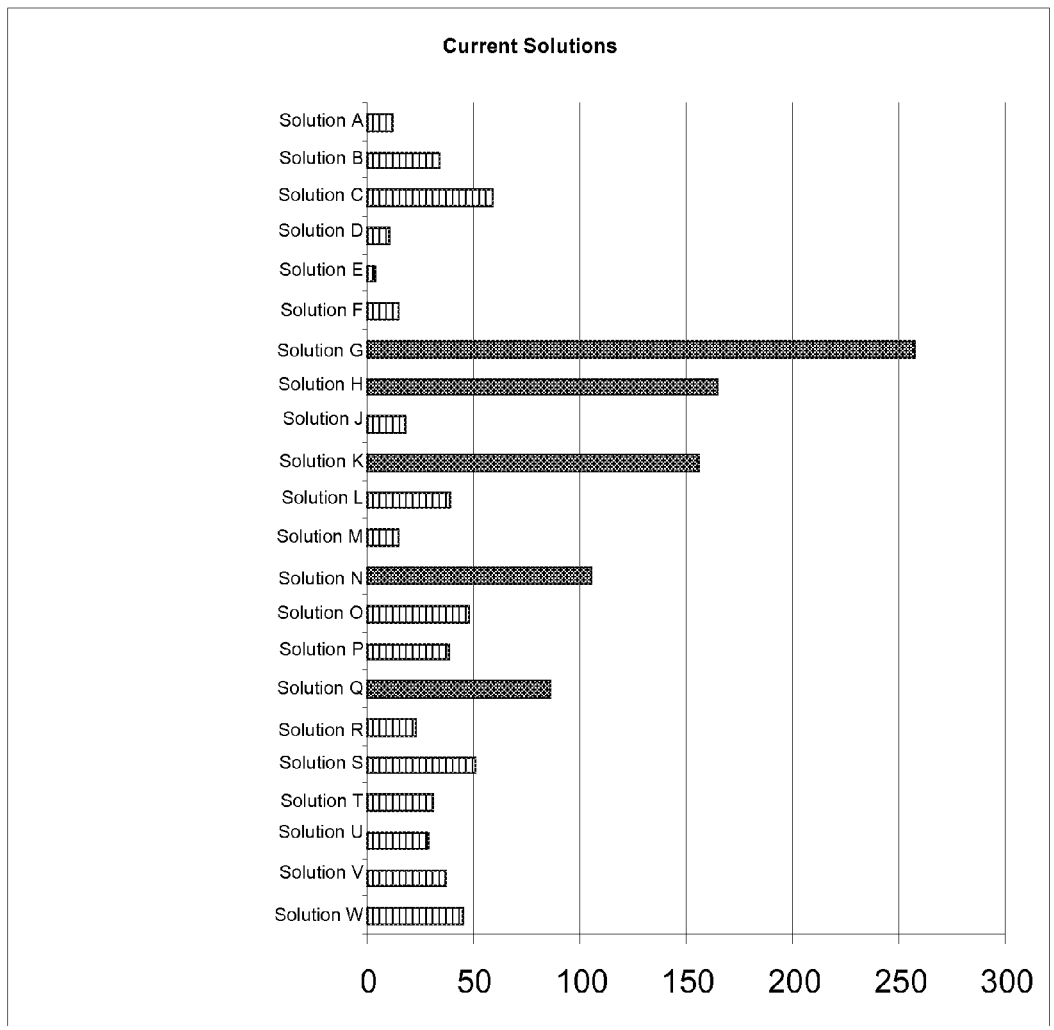

Europe
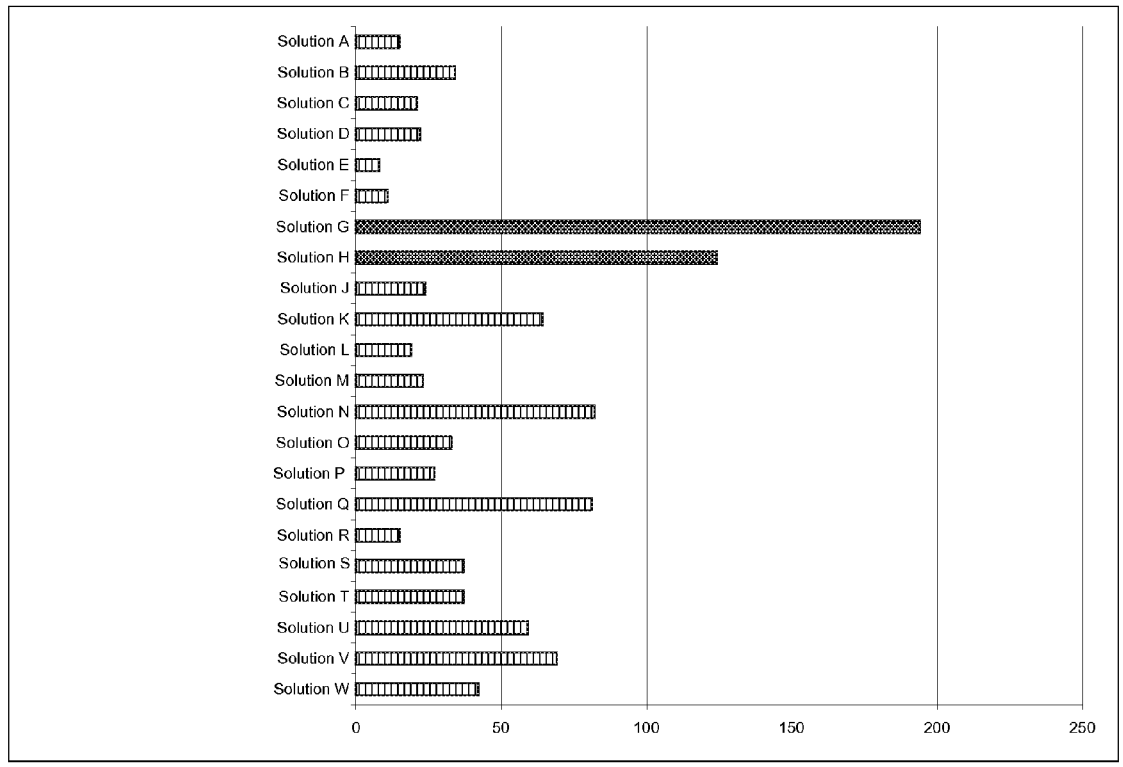

The job level of the new attendees remains consistent with existing attendees:
North America:
Europe:
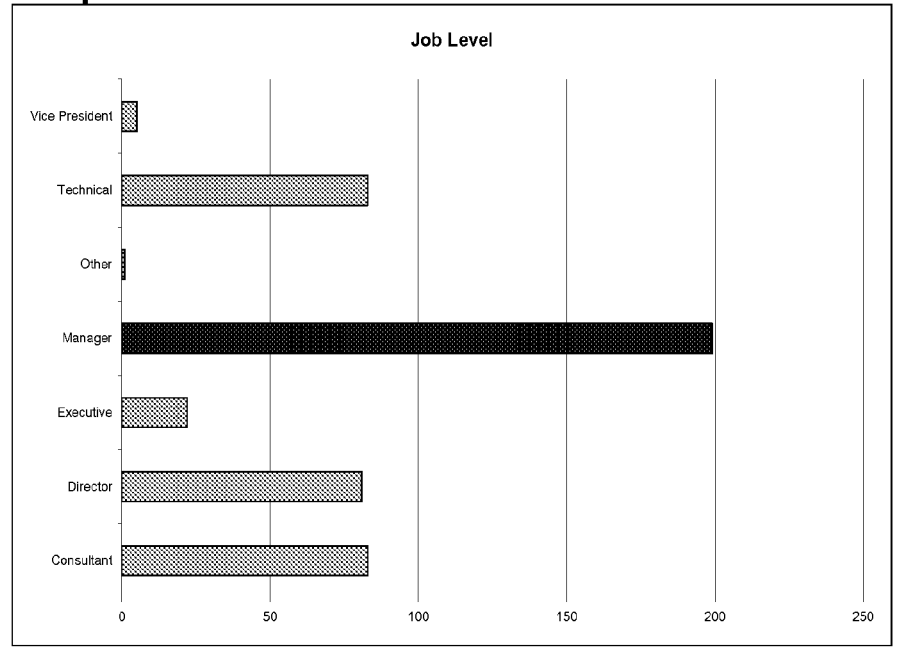

Summary

The Event A User Group Conference has provided significant value to COMPANY A in building a strong, loyal user community. This research and past performance clearly indicate the shared experience of coming together for an annual conference is an investment that aligns with corporate goals of growth, retention and broadening/deepening COMPANY A entrenchment with current users.

Continuing the sense of strong community for this legacy Company B user group is an important element to maintain as Event A becomes part of Event B. Continuing to track trends and behavioral changes from before this integration and after will help highlight the most important elements of the experience. Gaining understanding of the influencers of this group and creating messaging that resonates is also of utmost importance to retaining their loyalty as event attendees.

APPENDIX D

Meetings Effectiveness Study
Post-Event Questionnaire

GENERAL PROGRAMMER INSTRUCTIONS:
*(Respondent instructions are in parentheses, using italics and regular type)*

- Do not show question numbers or code values for ratings on screen.
- Force all questions unless otherwise stated
- Do not allow Suspends
- Do not allow Back-ups
- Do not allow Terminates
- Keep all mid-term data as well as completed surveys
- English Only
- Include small link to the support mailbox on login page. The text should read: For help with the survey, contact the survey manager.
- Disable keyboard "Enter" key.
- On rotate lists – keep other(specify), none and don't know at bottom Programmer Instructions are shown in [bold upper-lower case brackets].

[BELOW IS THE TEXT FOR THE LOG IN SCREEN.]

Thank you for taking a moment to complete this survey.

[Next screen]

INTRODUCTION

[Use standard welcome/instruction screen. Add this sentence at the end: Please take this very short survey so we can get your feedback on your Event A experience. You may have answered a survey prior to the event, which was different. IF you did not answer the previous survey we are still very much interested in your feedback. This survey is much shorter than the survey you may have taken prior to the conference. Some of the questions may be similar, but please answer them anyway. ]

SCREENER

S1. Did you attend Event A user group conference?

Yes ............................................................................ 1
No ...........................................................................2 [TERMINATE]

S2. Are you currently employed with Company A, whether full-time, part-time or on a contract basis?

Yes ............................................................... 1 [TERMINATE]
No ................................................................2 [Continue]
DK ...............................................................3 [TERMINATE]

DIRECT QUESTIONS

Q1. To what extent do you think attending Event A will influence your decision to purchase Company A products?

| | |
|---|---|
| Tremendously | 5 |
| Significantly | 4 |
| Somewhat | 3 |
| Not very much | 2 |
| Not at all | 1 |
| Don't know | 8 |

Q2. Did you use Event A to find Company A partners?

| | |
|---|---|
| Yes | 1 |
| No | 2 |
| Don't know | 8 |

Q3. Please indicate the user communities that you would prefer be included in Event A in the future.
    (Check all that apply)

| | |
|---|---|
| User Community 1 | 1 |
| User Community 2 | 2 |
| User Community 3 | 3 |
| User Community 4 | 4 |
| Resource management solutions | 5 |
| User Community 5 | 6 |
| Hardware | 7 |
| Other SPECIFY _____ | 8 |

Q4. Which of the following will be your goals at future Event A conferences? (Check all that apply)

Networking/Meeting with peers    1

| | |
|---|---|
| Learning about Company A products | 2 |
| Learning about best practices | 3 |
| Meeting Company A partners | 4 |
| Deploying Company A Products more cost effectively | 5 |
| Learning about Company A Strategic Directions | 6 |

Q13. How much does Event A influence your decision to purchase a converged set of products?

| | |
|---|---|
| Tremendously | 5 |
| Significantly | 4 |
| Somewhat | 3 |
| Not very much | 2 |
| Not at all | 1 |
| Don't know | 8 |

Q13a. What would you do to improve future Event A user group conferences?
   [Include text box]

DEMOGRAPHICS/FIRMOGRAPHICS

Q14a. Where are you located?

| | |
|---|---|
| Asia Pacific | 1 |
| Canada | 2 |
| Europe | 3 |
| South America | 4 |
| Mexico | 5 |
| Middle East/Africa | 6 |
| United States | 7 |
| Other (specify) | 96 |

Q15. Which of the following best describes your main job function?

| | |
|---|---|
| Business Decision Maker | 1 |
| Business User | 2 |
| IT | 3 |
| Operations | 4 |
| Executive/Upper Management | 5 |
| Project Lead | 6 |
| Some other function | 8 |

Q16. What specifically is your title?

TITLE: _____

Q17. Are you male or female?

Male ................................................................................. 1
    Female .............................................................................. 2

Q18. What is the highest level of education that you have completed?

Some high school/secondary school ................................ 1
    Graduated High School/secondary school ....................... 2
    Technical college or vocational school ............................. 3
    Some college/university ................................................... 4
    Graduated college/university ........................................... 5
    Post graduate work, degree or Masters/PHD .................. 6
    Prefer not to answer ........................................................ 9

Q19. In which of the following age groups do you belong?

Under 25 ........................................................................... 1
    25 to 29 ............................................................................ 2
    30 to 39 ............................................................................ 3
    40 to 49 ............................................................................ 4
    50 to 59 ............................................................................ 5
    60 and over ....................................................................... 6
    Prefer not to answer ........................................................ 9

Q20. Which of the following categories includes your total household income before taxes last year?

Less than €40,000 ............................................................ 1
    €40,000 but less than €60,000 ......................................... 2
    €60,000 but less than €80,000 ......................................... 3
    €80,000 but less than €120,000 ....................................... 4
    €120,000 but less than €150,000 ..................................... 5
    €150,000 or more ............................................................. 6
    Prefer not to answer ........................................................ 9

[Completion text]
Thank you for taking the time to do this survey. We know that your time is valuable and we appreciate your willingness to participate in this important research. Remember that your opinion counts. Have a great day/evening.

[Terminate text]
Your response indicates you are not familiar with Event A and therefore, you do not need to continue with this survey. Thank you for your time and interest.

APPENDIX E

Pre-Event Meetings Effectiveness Study
Distribution Emails and Questionnaire

Project/Study Name Pre-Event Meetings Survey
Title Bar: Pre-Event Meetings Survey
Type of Study:
Support Mailbox Name: Online Research – Questionnaire
Support Mailbox Address: msurvey@m.com
Development Survey Website URL:
Live Survey Website URL:
Field Status Link:
Privacy Link: http://www.m.com/research-privacy-statement.html#respondent

GENERAL PROGRAMMER INSTRUCTIONS:
- Do not show question numbers or code values for ratings on screen
- Force all questions unless otherwise stated
- Allow suspends
- Do not allow Back-ups
- Do not allow Terminates
- Keep all mid-term data as well as completed surveys
- English only
- Include small link to the support mailbox on login page. The text should read: For help with the survey, contact the survey manager (msurvey@m.com)
- Disable keyboard "Enter" key
- On rotate lists – keep other(specify), none, and don't know choices at bottom
- Start new page at each blue header – other page breaks to be added on survey finalization

FURTHER PROGRAMMING/REFERENCE NOTES:
- 'Boxed' section headers not shown on actual survey.
- *(Respondent instructions are in parentheses, using italics and regular type)*
- [PROGRAMMER INSTRUCTIONS ARE IN BOLD UPPER-CASE WITHIN BRACKETS].

PRE-SURVEY NOTICE EMAIL *(recommended to increase response rate)*

[NO PRE-SURVEY EMAIL PER EMAIL 6/27]

SURVEY DISTRIBUTION EMAIL *(TARGET DATE OUT 7/10)*
[UPDATED PER 6/27 EMAIL:]

Subject: We needs your input

Dear XYZ,

As a past participant, you are uniquely suited to providing feedback and insight which will help us create the right forums and opportunities within future meetings.

We have hired an independent, third-party market research company, to conduct this important survey. We are excited to include our partners in this research, and ask that you use this opportunity to help us and yourself, by assuring we shape future events based on your information needs and preferences To access the survey, please click the following link (or copy and paste it into your web browser):
[link]

Please complete the survey by August 1.
*Or*
*Please complete the survey by [month/day] to be entered into a random drawing for one of two $50 Gift Cards. The survey will take up to 15 minutes to complete, and your individual responses will remain anonymous and confidential.*
*(THE GIFT CARDS MIGHT REQUIRE YOU TO PROVIDE A LINK TO DRAWING RULES) [TAMMY CHECKING ON DRAWING REQUIRED TEXT & OPTIONS]*

We look forward to receiving your feedback!

[FIRST LAST]

REMINDER EMAIL *(TARGET DATES 7/17, 7/24, AND MAYBE 7/31)*

***\*Reminder: Your opinions are highly valued by us and are key to future meeting content decisions. Please respond to the survey below by August 1. Thank you.\****

[THEN REPEAT ABOVE EMAIL CONTENT]

SURVEY INTRODUCTORY SCREEN

Thank you for participating in this survey. Your feedback will be used to guide future development and operation of meetings.

If it hasn't already been filled in for you, please enter your passcode in the space below and press the Next Page button to continue.

| Passcode: | [PASSCODE] |

This online questionnaire should take approximately 10-15 minutes to complete. Should you need to leave during the middle of the questionnaire and return at a later time, simply re-enter your password and you will be entered back in at the point in the survey where you paused.

SCREENER
[NONE—REMOVED DUE TO SURVEY LENGTH EFFORTS]

SCORECARD
[NONE]

EVENT PREFERENCES - CONTENT

C1a. In which of the following categories would breakout sessions would be MOST and LEAST meaningful to you?

| [ROTATE ORDER—KEEP 'OTHER' LAST] | MOST Meaningful (mark 2) | LEAST Meaningful (mark 2) | |
|---|---|---|---|
| Category 1 | ○ | ○ | *1* |
| Category 2 | ○ | ○ | *2* |
| Category 3 | ○ | ○ | *3* |
| Category 4[REMOVE IF TOO MANY, I.E., IF PUSHES PAST SCREEN VIEW] | ○ | ○ | *4* |
| Category 5 | ○ | ○ | *5* |
| Category 6 | ○ | ○ | *6* |
| Category 7[REMOVE IF TOO MANY, I.E., IF PUSHES PAST SCREEN VIEW] | ○ | ○ | *7* |
| Category 8 | ○ | ○ | *8* |
| Category 9 | ○ | ○ | *9* |
| Category 10 | ○ | ○ | *10* |
| Category 11 | ○ | ○ | *11* |
| Category 12 | ○ | ○ | *12* |
| Category 13 | ○ | ○ | *13* |
| Category 14 | ○ | ○ | *14* |
| Category 15 | ○ | ○ | *15* |
| Category 16 | ○ | ○ | *16* |
| Category 17 | ○ | ○ | *17* |
| Category 18 | ○ | ○ | *18* |

C1b. Of those product categories remaining, which would be MOST and LEAST meaningful to you for breakout session topics?

| | MOST Meaningful (mark 3) | LEAST Meaningful (mark 3) |
|---|---|---|
| [LIST EXCLUDING THOSE MARKED IN QUESTION C1a ABOVE] | ○ | ○ |

C1c. Any other categories you would consider very meaningful for breakout session topic(s)?

| [Q TO POTENTIALLY REMOVE IF TOO LONG] |
|---|

C2a. Regarding which of the following types of information would be most meaningful to you?
*Please rank from 1 to 4, where 1 is MOST meaningful and 4 is LEAST meaningful. Use each number only once.* [ROTATE ORDER]

| | | |
|---|---|---|
| _____ | Information on products/services relative to the competition | *1* |
| _____ | Information on program/tools relative to the competition | *2* |
| _____ | Insight presented by us and industry on segment needs, industry information, etc. | *3* |
| _____ | Information on specific solutions designed to combine our products/services/program and other industry components. | *4* |

C2b. Any other types of information you would consider very meaningful for breakout session topic(s)?

C3. In which of the following segments would be most meaningful to you?
*Please rank from 1 to 4, where 1 is MOST meaningful and 4 is LEAST meaningful. Use each number only once.* [ROTATE ORDER]

| | | |
|---|---|---|
| _____ | Enterprise (non-named accounts) | *1* |
| _____ | Mid-market (co-size of 500-1000) | *2* |
| _____ | SMB (co. size of 10-499) | *3* |
| _____ | Public Sector (includes Federal, State & Local and Education) | *4* |

C4a. Regarding which of the following competitors would be most meaningful to you?
*Please rank from 1 to 9, where 1 is MOST meaningful and 9 is LEAST meaningful. Use each number only once.* [ROTATE ORDER]

| | | |
|---|---|---|
| _____ | Competitor 1 | *1* |
| _____ | Competitor 2 | *2* |
| _____ | Competitor 3 | *3* |
| _____ | Competitor 4 | *4* |
| _____ | Competitor 5 | *5* |
| _____ | Competitor 6 | *6* |
| _____ | Competitor 7 | *7* |
| _____ | Competitor 8 | *8* |
| _____ | Competitor 9 | *9* |

C4b. Any other competitors you would consider very meaningful for breakout session topic(s)?

C5. Regarding which of the following cross-portfolio topics would be most meaningful to you?
[ROTATE ORDER]
*Please rank from 1 to 7, where 1 is MOST meaningful and 7 is LEAST meaningful. Use each number only once.*

| | | |
|---|---|---|
| _____ | Optimization | 1 |
| _____ | Consolidation | 2 |
| _____ | Information Lifecycle Management | 3 |
| _____ | Business Intelligence | 4 |
| _____ | Data Center Management | 5 |
| _____ | Security | 6 |
| _____ | Managed Services | 7 |

C6a. In which of the following alliances would be MOST and LEAST meaningful to you?

| [ROTATE ORDER] | MOST Meaningful (mark 1) | LEAST Meaningful (mark 1) | |
|---|---|---|---|
| Alliance 1 | ○ | ○ | 1 |
| Alliance 2 | ○ | ○ | 2 |
| Alliance 3 | ○ | ○ | 3 |
| Alliance 4 | ○ | ○ | 4 |
| Alliance 5 | ○ | ○ | 5 |
| Alliance 6 | ○ | ○ | 6 |
| Alliance 7 | ○ | ○ | 7 |
| Alliance 8 | ○ | ○ | 8 |
| Alliance 9 | ○ | ○ | 9 |
| Alliance 10 | ○ | ○ | 10 |
| Alliance 11 | ○ | ○ | 11 |
| Alliance 12 | ○ | ○ | 12 |

C6b. Of those alliances remaining, which would be MOST and LEAST meaningful to you for breakout session topics?

| | MOST Meaningful (mark 2) | LEAST Meaningful (mark 2) |
|---|---|---|
| [LIST EXCLUDING THOSE MARKED IN QUESTION C6a ABOVE] | ○ | ○ |

C6c. Any other alliances you would consider very meaningful for breakout session topic(s)?

| |
|---|
| [Q MAY CONSIDER REMOVING IF SURVEY TOO LONG] |

[RECOMMENDED MAX DIFF SECTION INTRODUCTION TEXT (TO SET EXPECTATIONS AND ATTEMPT TO REDUCE DROPS):]

The next section asks you to prioritize a variety of specific breakout topics that might be offered as sessions in a future Partner meeting. Because we wants to offer you a broad and detailed selection of topics, you will see approximately XX screens, asking you to identify the MOST and LEAST appealing topic from lists of X topics.

While this effort may seem repetitive, including a short list of topics on each screen enables your to prioritize topics without having to read an extensive list of topics at one time. It also enables us to be provided with a valuable results tool to help us offer the best mix of sessions at future conferences. This section is most important to our objectives and your time/attention is very much appreciated.

(Note: Remaining in this survey after this section are just two comment questions, where you will have the opportunity to write in any topics you want to see offered that were not in our list. So, as you are answering the following pages, think about other topics important to you that should be added to our consideration list. Thank you.)

C7. Which of the following specific breakout session topics would be MOST and LEAST meaningful to you?
[SAMPLE MAXIMUM DIFFERENTIAL SCREEN SHOT—ACTUAL COMBINATIONS/QUANTITIES DETERMINED BY MARKETING SCIENCES FOR PROGRAMMING]

| [SAMPLE-- SEE APPENDIX FOR FULL C7 SESSION TOPIC LIST: 47 TOTAL TOPICS] | *MOST (Mark one)* | *LEAST (Mark one)* |
|---|---|---|
| Topic 1 | ○ | ○ |
| Topic 2 | ○ | ○ |
| Topic 3 | ○ | ○ |
| Topic 4 | ○ | ○ |
| Topic 5 | ○ | ○ |
| Topic 6 | ○ | ○ |

C8. What other breakout session topic(s), not previously listed, should be offered? *(Please be as specific as possible. If no suggestions, please skip to the next question.)*
[a]
[b]
[c]
[Q9 MORE IMPORTANT THAN 8, IF CONTINUED SURVEY LENGTH CONCERN]

C9. What information would you most like to hear within a keynote address?

[a1] Topic: _____
[a2] Speaker/speaker type: _____

[b1] Topic: _____
[b2] Speaker/speaker type: _____

EVENT PREFERENCES - PRESENTER TYPES
[REMOVED DUE TO SURVEY LENGTH CONSIDERATIONS]

OTHER DIRECT QUESTIONS
[NOT INCLUDED DUE TO SURVEY LENGTH CONSIDERATIONS]

RESPONDENT CLASSIFICATION
[FIELDS TO BE PROVIDED TO ATTACH TO SURVEY DATA—NO ADDITIONAL ASKED DIRECTLY DUE TO SURVEY LENGTH CONSIDERATIONS]

RESPONDENT REWARD

What is claimed is:

1. A computer implemented method of developing an event designed to appeal to prospective attendees associated with an event-owner, said method executed by at least one processor, said method comprising:
   receiving by the processor one or more attributes of an event to be developed and preferred values of the attributes, wherein said preferred values of the attributes are collected from a survey completed by a plurality of the prospective attendees;
   modeling by the processor the collected prospective attendee preferred values to generate weighted prospective attendee preferred values for the attributes;
   building by the processor a user interface decision support tool from the weighted prospective attendee preferred values, wherein said user interface decision support tool is configured to simulate the prospective attendees' preference for subsequently developed events;
   defining by the processor a first event as a function of a set of attributes and a first set of attribute values received from the event-owner that correspond to the set of attributes;
   defining a second event as a function of the set of attributes and a second set of attribute values received from the event-owner that correspond to the set of attributes, wherein for at least one attribute the corresponding attribute value of the first set is different from the corresponding attribute value of the second set;
   displaying by the processor for the event-owner the first and second events; and
   providing by the processor via the user interface decision support tool a numeric comparison for the event-owner of the first event to the second event as a function of the weighted prospective attendees preferred values, said numeric comparison quantifying the prospective attendees' preference for the first event to that of second event;
   receiving by the processor breakout session preferences from a plurality of the prospective attendees utilizing Q-sort surveying;
   analyzing by the processor the collected breakout session preferences to determine one or more of the following for potential breakout sessions: the reach of the breakout sessions, frequency of the breakout sessions, and overlap of the breakout sessions.

2. The method of claim 1, further comprising:
   generating by the processor a survey that is a choice-based conjoint experiment;
   presenting by the processor the survey to the plurality of prospective attendees to gather data from the prospective attendees; and
   analyzing the data through hierarchical Bayesian multinomial logit.

3. The method of claim 1, wherein the user interface decision support tool is a conjoint simulation tool which simulates choices among multiple event designs.

4. The method of claim 1, wherein TURF (Total Unduplicated Reach & Frequency) analysis is conducted on the breakout session preferences to determine one or more of the following for potential breakout sessions: the reach of the breakout sessions, frequency of the breakout sessions, and overlap of the breakout sessions.

5. The method of claim 1, wherein the break session preferences relate to one or more of the following: the content of the breakout session, the format of the breakout session and the speaker type of the breakout session.

* * * * *